United States Patent
Uechi et al.

(10) Patent No.: US 9,238,453 B2
(45) Date of Patent: Jan. 19, 2016

(54) MASTER CYLINDER DEVICE

(75) Inventors: Masaaki Uechi, Nissin (JP); Hiroshi Ueno, Toyota (JP); Kiyoyuki Uchida, Konan (JP); Akira Sakai, Toyota (JP); Tatsuo Sugitani, Miyoshi (JP); Kazuya Maki, Nagoya (JP); Satoshi Ishida, Chiryu (JP)

(73) Assignees: TOYOTA JIDOSHA KABUSHIKI KAISHA, Toyota-shi (JP); ADVICS CO., LTD., Kariya-shi (JP)

( * ) Notice: Subject to any disclaimer, the term of this patent is extended or adjusted under 35 U.S.C. 154(b) by 74 days.

(21) Appl. No.: 13/823,252

(22) PCT Filed: Sep. 21, 2011

(86) PCT No.: PCT/JP2011/071428
§ 371 (c)(1),
(2), (4) Date: Mar. 14, 2013

(87) PCT Pub. No.: WO2012/039411
PCT Pub. Date: Mar. 29, 2012

(65) Prior Publication Data
US 2013/0167716 A1     Jul. 4, 2013

(30) Foreign Application Priority Data
Sep. 24, 2010  (JP) ................................. 2010-213048

(51) Int. Cl.
*B60T 11/18*     (2006.01)
*B60T 11/16*     (2006.01)
(Continued)

(52) U.S. Cl.
CPC ................. *B60T 11/18* (2013.01); *B60T 11/16* (2013.01); *B60T 13/662* (2013.01); *B60T 7/042* (2013.01); *B60T 13/16* (2013.01); *B60T 2270/60* (2013.01)

(58) Field of Classification Search
CPC ......... B60T 7/042; B60T 8/441; B60T 8/442; B60T 11/16; B60T 11/165; B60T 11/18; B60T 13/16; B60T 13/147; B60T 13/161; B60T 13/162
USPC .......... 60/545, 593; 188/358, 359; 303/114.1, 303/114.2
See application file for complete search history.

(56) References Cited

U.S. PATENT DOCUMENTS 3,799,300 A  *  3/1974  Cochrane et al. ............. 477/183
4,729,609 A  *  3/1988  Seibert et al. ............... 303/114.1
(Continued)

FOREIGN PATENT DOCUMENTS

JP     2004 131056     4/2004
JP     2007 55588      3/2007
(Continued)

OTHER PUBLICATIONS

International Search Report Issued Dec. 20, 2011 in PCT/JP11/71428 Filed Sep. 21, 2011.

*Primary Examiner* — Edward Look
*Assistant Examiner* — Michael Quandt
(74) *Attorney, Agent, or Firm* — Oblon, McClelland, Maier & Neustadt, L.L.P.

(57) ABSTRACT

A master cylinder device including: a housing whose front side is closed and which has a separation wall for separating the inside of the housing into a front side chamber and a rear side chamber; a pressurizing piston disposed in the front side chamber so as to define a pressurizing chamber for pressurizing the brake fluid and an input chamber into which a brake fluid from a high pressure source is introduced; an input piston disposed in the rear side chamber and moving forward by an operation force; and a transmission rod which is through the separation wall, whose proximal end portion is fixed in one of the pressurizing and input pistons, and whose distal end portion is apart from the other of the pressurizing and input pistons in a state of no forward movement.

17 Claims, 8 Drawing Sheets

(51) Int. Cl.
  *B60T 13/66* (2006.01)
  *B60T 7/04* (2006.01)
  *B60T 13/16* (2006.01)

(56) References Cited

U.S. PATENT DOCUMENTS

| | | | | |
|---|---|---|---|---|
| 4,807,942 | A | * | 2/1989 | Belart .......................... 303/114.1 |
| 5,813,230 | A | * | 9/1998 | Hartl et al. ...................... 60/591 |
| 5,983,637 | A | * | 11/1999 | Lubbers et al. ................. 60/549 |
| 6,149,248 | A | * | 11/2000 | Lubbers et al. ............ 303/114.1 |
| 6,953,229 | B2 | * | 10/2005 | Isono et al. ................. 303/114.1 |
| 7,159,696 | B2 | * | 1/2007 | Kusano ......................... 188/152 |
| 7,861,523 | B2 | | 1/2011 | Isono et al. |
| 8,091,356 | B2 | | 1/2012 | Isono et al. |
| 8,424,976 | B2 | * | 4/2013 | Dinkel et al. ..................... 303/3 |
| 2004/0004393 | A1 | | 1/2004 | Richard |
| 2008/0229741 | A1 | * | 9/2008 | Isono et al. ..................... 60/581 |
| 2009/0179485 | A1 | | 7/2009 | Yang |
| 2012/0144822 | A1 | | 6/2012 | Isono |

FOREIGN PATENT DOCUMENTS

| | | |
|---|---|---|
| JP | 2007 196824 | 8/2007 |
| JP | 2009 502623 | 1/2009 |
| JP | 2010 202188 | 9/2010 |
| JP | 2011 51400 | 3/2011 |

\* cited by examiner

MASTER CYLINDER DEVICE

TECHNICAL FIELD

The present invention relates to a master cylinder device for pressurizing a brake fluid and supplying the brake fluid to a brake device provided in a wheel.

BACKGROUND ART

In hybrid vehicles, electric vehicles, and the like which are actively developed in recent years, a resistance force generated by an electric motor or an electric generator etc. which is driven by a rotation of a wheel is utilized for a regenerative brake. Additionally, even in these vehicles, a hydraulic brake in which a brake device is actuated by a brake fluid pressurized by a master cylinder device is utilized like a conventional vehicle. As for these vehicles, when a brake operation amount is small, that is, when a required brake force is small, the vehicle is braked with the regenerative brake. As the brake operation amount increases with the required brake force increasing, the vehicle is braked with not only the regenerative brake but also the hydraulic brake. Therefore, in the above vehicles, both brakes can brake the vehicle while cooperating with each other such that a brake force in the hydraulic brake is generated in a condition in which a brake force of the regenerative brake is insufficient. For such cooperation, each of master cylinder devices disclosed in the following Patent Literatures is configured to be able to pressurize a brake fluid depending on not a brake operation force by a driver but only a pressure of a brake fluid introduced from a high pressure source. That is, each of the master cylinder devices is configured to be able to voluntarily pressurize the brake fluid irrespective of a brake operation by the driver, thereby actuating the brake device only where necessary.

Patent Literature 1: JP-2007-55588-A
Patent Literature 2: JP-2009-502623-A

DISCLOSURE OF THE INVENTION

(A) Summary of the Invention

In the master cylinder device pressurizing the brake fluid depending on only the high pressure source, in a case that a large brake force is required, such as a case of an emergency brake, the brake fluid must be introduced from the high pressure source to the master cylinder device for the purpose of generating, at a required magnitude, a hydraulic brake force being the brake force in the hydraulic brake. For this purpose, the high pressure source is requested to have a capability of pressurizing the brake fluid up to a comparatively high pressure. Therefore, the high pressure source cannot help avoiding enlargement of a pump for pressurizing the brake fluid or a motor for driving the pump. As a result, the high pressure source becomes large, thereby causing increase of an installation space or a cost. This is one of problems that the master cylinder device has. In the master cylinder device, there are other problems in which room for improvement is left. So, if it is possible to solve any of those problems, utility of the master cylinder device can be improved. The invention is carried out in the light of the current situation described above. It is therefore an object of the invention to improve utility of a master cylinder device.

To solve the above object, a master cylinder device according to the invention comprises: (a) a housing whose front side is closed and which has a separation wall for separating the inside of the housing into a front side chamber and a rear side chamber; (b) a pressurizing piston disposed in the front side chamber so as to define a pressurizing chamber for pressurizing a brake fluid and an input chamber into which a brake fluid from a high pressure source is introduced; (c) an input piston disposed in the rear side chamber and moving forward by an operation force; (d) an operation-reaction-force applying mechanism for applying an operation reaction force according to an amount of the forward movement; and (e) a transmission rod which is through the separation wall, whose proximal end portion is fixed in one of the above pistons, and whose distal end portion is apart from the other of the above pistons in a state of no forward movement, and is configured, in a state in which the distal end portion does not abut on the other of the pistons, a state in which a brake force is generated in a brake device by a pressure of the brake fluid in the pressurizing chamber pressurized depending on the pressure of the high pressure source is realized, and, in a state in which the distal end portion abuts on the other of the pistons, a state in which a brake force is generated in the brake device by the pressure of the brake fluid in the pressurizing chamber pressurized depending on not only the pressure of the high pressure source but also the operation force is realized.

The master cylinder device according to the invention can make the pressure of the brake fluid in the pressurizing chamber be higher than that in the state of depending on the pressure of the high pressure source, thereby generating a large hydraulic brake force in the brake device. From the other point of view, even where the present master cylinder device employs a comparatively small high pressure source, the master cylinder device can pressurize the brake fluid to be supplied to the brake device such that a large hydraulic brake force is generated. This can enhance utility of the master cylinder device.

(B) Forms of Claimable Invention

There will be exemplified and explained various forms according to an invention which is considered claimable (hereinafter referred to as "claimable invention" where appropriate). It is to be understood that combinations of constituent elements that constitute the invention are not limited to those described in the following forms. That is, it is to be understood that the claimable invention shall be construed in the light of the following descriptions of various forms and preferred embodiments. It is to be further understood that any form in which one or more elements is/are added to or deleted from any one of the following forms may be considered as one form of the claimable invention.

The following forms various aspects of the invention as claimed. In addition, an element regarding an effect of a pressure of a brake fluid in the input chamber on the input piston may be added to any of the following forms.

(1) A master cylinder device for supplying a pressurized brake fluid to a brake device provided in a wheel and actuated by a pressure of the brake fluid, comprising:

a housing whose front side is closed and which has a separation wall for separating the inside of the housing into a front side chamber and a rear side chamber;

a pressurizing piston disposed in the front side chamber of the housing such that a pressurizing chamber for pressurizing the brake fluid to be supplied to the brake device is defined in front of the pressurizing piston and an input chamber into which a brake fluid from a high pressure source is introduced is defined in the rear of the pressurizing piston;

an input piston which is disposed in the rear side chamber of the housing, whose rear end portion is connected to a brake operation member, and which moves forward by an operation force applied to the brake operation member;

an operation-reaction-force applying mechanism for applying an operation reaction force according to a forward movement amount of the input piston to the input piston; and a transmission rod which is through the separation wall, whose proximal end portion is fixed in one of the input piston and the pressurizing piston, and whose distal end portion is apart from the other of the input piston and the pressurizing piston in a state in which the input piston is not moved forward, wherein, in a state in which the distal end portion of the transmission rod does not abut on the other of the input piston and the pressurizing piston, a pressurizing of the brake fluid in the pressurizing chamber depending on the pressure of the high pressure source is realized, and, in a state in which the distal end portion of the transmission rod abuts on the other of the input piston and the pressurizing piston, a pressurizing of the brake fluid in the pressurizing chamber depending on not only the pressure of the high pressure source but also the operation force is realized.

According to the above structure, in the state in which the distal end portion is apart from the other of the pressurizing piston and the input piston, the operation force applied to the brake operation member is not transmitted to the pressurizing piston. When the brake fluid is introduced from the high pressure source in the state, the pressurizing piston moves forward depending on the pressure of the brake fluid (hereinafter, referred to as a "high-pressure-source pressure", where appropriate), thereby pressurizing the brake fluid in the pressurizing chamber. In other word, the master cylinder device comes into a state of pressurizing the brake fluid depending on only the high-pressure-source pressure (hereinafter, referred to as a "high-pressure-source-pressure dependent pressurizing state", where appropriate). In addition, according to the above structure, when the input piston moves forward by a brake operation, and the distal end portion of the transmission rod comes into abutting contact with the other of the pressurizing piston and the input piston, the operation force (strictly speaking, at least a part of the operation force) is transmitted from the input piston to the pressurizing piston via the transmission rod. That is, the pressurizing piston is moved forward by not only the pressure of the brake fluid from the high pressure source but also the operation force. In this situation, the master cylinder device is in a state of pressurizing the brake fluid depending on both the high-pressure-source pressure and the operation force (hereinafter, referred to as a "high-pressure-source-pressure/operation-force dependent pressurizing state", where appropriate). In the high-pressure-source-pressure/operation-force dependent pressurizing state, since it is possible to pressurize the brake fluid by the high-pressure-source pressure and the operation force, it is possible to make the pressure of the brake fluid in the pressurizing chamber (hereinafter, referred to as an "output pressure" or "master pressure", where appropriate) be higher than the in the high-pressure-source pressure dependent pressurizing state. Therefore, it is possible to make the hydraulic brake force generated by the brake device be large. Accordingly, even though the brake fluid of a comparatively high pressure is not introduced from the high pressure source, the present master cylinder device can pressurize the brake fluid to be supplied to the brake device such that a large hydraulic brake force is generated. Consequently, the present master cylinder device can employ a comparatively small high pressure source, thereby reducing an installation space and a cost of the high pressure source.

Moreover, for example, when the distal end portion of the transmission rod abuts on the other of the input piston and the pressurizing piston in a condition in which an electric failure etc. occurs in a brake system having the present master cylinder device and then the brake fluid is not introduced from the high pressure source to the input chamber, the master cylinder device comes into a state of pressurizing the brake fluid depending on only the operation force (hereinafter, referred to as a "operation force dependent pressurizing state", where appropriate). Therefore, the master cylinder device according to the form is a master cylinder device in which the pressurization of the brake fluid for generating the hydraulic brake force is secured even in a condition in which a failure etc. occurs in the high pressure source, and is a master cylinder device favorable in the light of fail-safe.

The separation wall of the housing of the master cylinder device is not limited in its shape as long as it can separate the inside of the housing into a front side chamber and a rear side chamber. In other words, the separation wall may be an object not having a shape of an apparent wall. In this meaning, the separation wall can be called a separation wall portion of the housing. More specifically, since the transmission rod is through the separation wall, the separation wall has a different shape in accordance with a cross-section shape of the transmission rod. For example, where the inside of the housing is shaped like a cylinder and the transmission rod is shaped like a round bar through the center portion of the separation wall, the separation wall has a ring shape. In addition, where the outer diameter of the transmission rod is comparatively large, a height of the separation wall from an inner periphery of the housing becomes low, and thus the separation wall has a shape like an annular projection. The master cylinder device including the separation wall of such a shape can be also considered as one form of the present master cylinder.

Moreover, according to the above structure, in the high-pressure-source-pressure dependent pressurizing state, that is, in a state in which the distal end portion of the transmission rod does not abut on the other of the pressurizing piston and the input piston, and thus a driver cannot realistically feel the pressure of the brake fluid in the pressurizing chamber as the operation reaction force, the driver can realistically feel the operation reaction force according to the forward movement amount of the input piston owing to the operation-reaction-force applying mechanism. Therefore, the driver can perform a brake operation without sensing unfavorable feeling.

It is noted that "fixing the transmission rod to one of the input piston and the pressurizing piston" in the present master cylinder device means fixing in a forward and rearward direction, that is, a moving direction of the input piston or the pressurizing piston. In other words, it means that a relative movement between the transmission rod, and the input piston or the pressurizing piston to which the transmission rod is fixed is prohibited in the moving direction. Accordingly, the transmission rod, and the input piston or the pressurizing piston to which the transmission rod is fixed may be allowed to rotate relative to each other around the axis extending the moving direction.

A structure of the operation-reaction-force applying mechanism is not limited especially, and various kinds of structures can be employed. The operation-reaction-force applying mechanism may be constructed as described below, that is, constructed such that a pressurizing mechanism pressurizes a brake fluid, and a pressure of the pressurized brake fluid is transmitted via the input piston to the brake operation member as the reaction force. Alternatively, the operation-reaction-force applying mechanism may be constructed to have, as a main component, an elastic member disposed in the rear side chamber and biasing the input piston rearward. Therefore, in the present master cylinder device, the operation-reaction-force applying mechanism functions as a so-called stroke simulator, and thus the driver can realistically feel the operation reaction force against a brake operation by the driver.

(2) The master cylinder device according to the form (1),
wherein the other of the input piston and the pressurizing piston has a blind hole in which the transmission rod is fitted, and
wherein a bottom portion of the blind hole and the transmission rod are apart from each other in the state in which the input piston does not move forward.

In the master cylinder device according to this form, the input chamber is formed with a ring shape in a space surrounding the transmission rod. The form is especially advantageous in the master cylinder device in which the transmission rod is fixed to the input piston and the blind hole is provided in the pressurizing chamber. More specifically, in this master cylinder device, since the transmission rod is fitted in the blind hole, the inside of the blind hole is isolated from the outside. That is, where the blind hole is provided in the pressurizing piston, the inside of the blind hole is isolated from the input chamber, whereby a pressure of the input chamber never acts on the distal end portion of the transmission rod. Therefore, the pressure of the input chamber never acts on the input piston, and thus the driver can perform a brake operation without being influenced by the pressure of the brake fluid in the input chamber.

In the master cylinder device employing the operation-reaction-force applying mechanism described below, that is, the operation-reaction-force applying mechanism in which a reaction force chamber is defined in the rear side chamber of the housing, the transmission rod may be fixed to the pressurizing piston and the blind hole may be provided in the input piston. In such a master cylinder device, the inside of the blind hole is isolated from the reaction force chamber. Therefore, a pressure of the reaction force chamber never acts on the distal end portion of the transmission rod, that is, the pressurizing piston, and thus the pressurizing piston can move without being influenced by the pressure of the reaction force chamber.

(3) The master cylinder device according to the form (2),
wherein an inter-piston chamber filled with a brake fluid is defined by the bottom portion of the blind hole and the transmission rod, and
wherein the master cylinder device comprises
an inter-piston-chamber communication passage by which the inter-piston chamber communicates with a low pressure source, and
an inter-piston-chamber hermetically-closing device for hermetically closing the inter-piston chamber by shutting off the inter-piston-chamber communication passage.

In the embodiment according to this form, where the inter-piston chamber communicates with the low pressure source, the pressurizing piston and the input piston can move without influencing each other. That is, it comes into a state in which a relative movement of the pressurizing piston and the input piston is allowed. Therefore, where the inter-piston chamber communicates with the low pressure source in the high-pressure-source-pressure dependent state, the movement of the input piston by an operation of the brake operation member and the movement of the pressurizing piston by the high-pressure-source pressure are performed without influencing each other. That is, the pressurizing piston moves depending on only the high-pressure-source pressure irrespective of a brake operation by the driver.

When the inter-piston chamber is hermetically closed by the above inter-piston-chamber hermetically-closing device, the operation force is transmitted to the pressurizing piston via a brake fluid in the inter-piston chamber. Accordingly, it becomes possible to transmit the operation force to the pressurizing piston not only in the above described state in which the distal end portion of the transmission rod abuts on the other of the input piston and the pressurizing piston but also in a state in which the distal end portion does not abut on the other. For example, where the master cylinder device is configured to hermetically close the inter-piston chamber in a condition in which the high pressure source fails, the operation force is transmitted via the brake fluid in the inter-piston chamber immediately after a beginning of a brake operation. Therefore, even in the failure condition, the hydraulic brake force is generated in the operation-force dependent pressurizing state immediately after a beginning of a brake operation. As a result, it is possible to constitute a master cylinder device with a superior operation characteristic, in which a period in which the hydraulic brake force is not generated though a brake operation is performed, namely, an idle operation period hardly exists.

Even while the high pressure source works normally, the master cylinder device is actuated in the high-pressure-source-pressure/operation-force dependent pressurizing state after a moment when the inter-piston chamber is hermetically closed in a state in which the distal end portion of the transmission rod does not abut on the other of the input piston and the pressurizing piston. For example, as for the above described master cylinder device, the hydraulic brake force never become larger than ever from a state in which the hydraulic brake force comes equal to the maximum in the high-pressure-source-pressure dependent pressurizing state to a state in which the distal end portion of the transmission rod comes into abutting contact with the other of the other of the pressurizing piston and the input piston, that is, the master cylinder device comes into the high-pressure-source-pressure/operation-force dependent pressurizing state. In other words, until the distal end portion of the transmission rod comes into abutting contact with the other of the other of the pressurizing piston and the input piston, the hydraulic brake force does not increase even though a brake operation amount increases. The master cylinder device of this form can quickly shift to the high-pressure-source-pressure/operation-force dependent pressurizing state by the hermetical closing of the inter-piston chamber. Whereby, for example, where the inter-piston chamber is hermetically closed at a moment when the hydraulic brake force depending on the high-pressure-source pressure comes equal to the maximum, the hydraulic brake force smoothly increases with respect to the increase of the operation amount in the shift from the high-pressure-source-pressure dependent pressurizing state to the high-pressure-source-pressure/operation-force dependent pressurizing state. Therefore, the driver can perform a brake operation without sensing unfavorable feeling in a change of the brake force with respect to the operation amount.

(4) The master cylinder device according to the form (3),
wherein the inter-piston-chamber hermetically-closing device is configured so as to hermetically close the inter-piston chamber on the basis of any one of a pressure of the brake fluid in the pressurizing chamber, a pressure of the brake fluid in the input chamber, the operation force, and an operation amount of the brake operation member.

In this form, "on the basis of any one of a pressure of the brake fluid in the pressurizing chamber, a pressure of the brake fluid in the input chamber, the operation force, and an operation amount of the brake operation member" is a concept which includes using, as an index of hermetically closing the inter-piston chamber, not only any one of the pressure, the force, and the like but also any one of another pressure, another force, and the like indexing any one of the pressure, the force, and the like. That is, where any one of another pressure, another force, and the like indirectly indexes any one of the pressure of the brake fluid in the pressurizing chamber, the pressure of the brake fluid in the input chamber, the operation force, and the operation amount of the brake operation member, the inter-piston chamber may be hermetically closed on the basis of any one of said another pressure, said another force, and the like. For example, since a pressure of a brake fluid in a communication passage for supplying the brake fluid from the pressurizing chamber to the brake device indirectly indexes the pressure of the brake fluid in the pressurizing chamber, the inter-piston chamber may be hermetically closed on the basis of the pressure of the brake fluid in the communication passage. Alternatively, since a pressure of a brake fluid in a communication passage extending from the high pressure source to the input chamber indirectly indexes the pressure of the brake fluid in the input chamber, the inter-piston chamber may be hermetically closed on the basis of the pressure of the brake fluid in the communication passage. Moreover, as described below, where the reaction-force applying mechanism includes a pressurizing mechanism and pressurizes a brake fluid such that the operation reaction force is generated, a pressure of the brake fluid indirectly indexes the operation force, whereby the inter-piston chamber may be hermetically closed on the basis of the pressure of the brake fluid.

For example, the inter-piston-chamber hermetically-closing device, as described below, may be constructed with an electromagnetic valve for opening and closing the inter-piston chamber communication passage and a controller for opening and closing the electromagnetic valve. In addition, the master cylinder device may include a sensor for detecting any one of the pressure, the force, and the like that is used as an index. In the inter-piston chamber hermetically-closing device constructed thus, the controller controls the opening and closing of the electromagnetic valve on the basis of any one of the pressure, the force, and the like detected by the sensor. The closing results in the hermetical closing of the inter-piston chamber, and the opening results in a release of the hermetical closing.

Moreover, the inter-piston-chamber hermetically-closing device, as described below, may be constructed with a mechanical valve. That is, the mechanical valve provided on the inter-piston chamber communication passage may be a mechanical valve into which the pressure etc. used as the index is introduced and which opens and closes on the basis of the pilot pressure.

(5) The master cylinder device according to the form (4), wherein the inter-piston-chamber hermetically-closing device is configured so as to hermetically close the inter-piston chamber when any one of the pressure of the brake fluid in the pressurizing chamber, the pressure of the brake fluid in the input chamber, the operation force, and the operation amount of the brake operation member exceeds a predetermined value.

In a brake operation, the index of hermetically closing the inter-piston chamber, such as the pressure of the brake fluid in the pressurizing chamber, the pressure of the brake fluid in the input chamber, the operation force, and the operation amount of the brake operation member, changes. In the master cylinder device according to this form, for example, when a value of the index exceeds the predetermined value, the inter-piston chamber is hermetically closed. For example, where the master cylinder device is constructed such that the value of the index becomes larger as the hydraulic brake force becomes larger in the high-pressure-source-pressure dependent pressurizing state, the inter-piston chamber may be hermetically closed at a moment when the value of the index exceeds the predetermined value. After this moment, the master cylinder device is actuated in the high-pressure-source-pressure/operation-force dependent pressurizing state, and thus the hydraulic brake force larger than that in the high-pressure-source-pressure dependent pressurizing state is generated. That is, it is possible to construct the master cylinder device which shifts from the high-pressure-source-pressure dependent pressurizing state to the high-pressure-source-pressure/operation-force dependent pressurizing state in a case that a required hydraulic brake force is large.

In such a master cylinder device, the predetermined value may be determined so as to be the value of the above index at the moment when the hydraulic brake force in the high-pressure-source-pressure dependent pressurizing state comes close or equal to the maximum. Where the predetermined value is determined thus, the above described period, that is, the period in which the hydraulic brake force does not become larger with respect to the increase of the operation amount after the hydraulic brake force in the high-pressure-source-pressure dependent pressurizing state comes equal to the maximum, does not occur, and thus the hydraulic brake force smoothly increases with respect to the increase of the operation amount. Therefore, the driver can perform a brake operation without sensing unfavorable feeling in a change of the brake force with respect to the operation amount.

Incidentally, "when exceeding a predetermined value" is a concept including not only "when becoming larger than the predetermined value" but also "when becoming smaller than the predetermined value". That is, the inter-piston chamber hermetically-closing device may be configured to hermetically close the inter-piston chamber when the value of the index becomes smaller than the predetermined value. In other words, the inter-piston chamber hermetically-closing device may be configured to utilize the predetermined value as a threshold for hermetically closing the inter-chamber piston or releasing the hermetical closing.

(6) The master cylinder device according to any one of the forms (3)-(5), wherein the inter-piston-chamber hermetically-closing device includes an electromagnetic valve provided on the inter-piston-chamber communication passage and a valve controller for controlling the electromagnetic valve.

In this form, a limitation regarding a structure of the inter-piston-chamber hermetically-closing device is added. As for the electromagnetic valve, for example, an open/close valve may be employed. In this construction, the controller may compare the value of any one of the pressure, the force, and the like described above with the predetermined value, and can control the open/close valve to be opened and closed based on the result of the comparison, thereby hermetically closing the inter-piston chamber and releasing the hermetical closing.

In the master cylinder device of this form, it is preferable that the electromagnetic valve is a normally-closed valve which closes in the electric failure condition. Where the normally-closed valve is employed, the inter-piston chamber is, as described above, hermetically closed in the electric failure condition. Therefore, the hydraulic brake force generates in the operation-force dependent pressurizing state immediately after a beginning of a brake operation. Consequently, it is possible to constitute a master cylinder device with a superior operation characteristic, in which the idle operation period hardly occurs.

(7) The master cylinder device according to any one of the forms (3)-(5), wherein the inter-piston-chamber hermetically-closing device includes a mechanical valve to be activated with any one of the pressure of the brake fluid in the pressurizing chamber, the pressure of the brake fluid in the input chamber, and a pressure indexing the operation force serving as a pilot pressure.

In the embodiment of this form, a limitation regarding the inter-piston-chamber hermetically-closing device is added. According to the above structure, the inter-piston-chamber hermetically-closing device can be constructed with a comparatively simple mechanical valve. For example, where the reaction-force applying mechanism includes a pressurizing mechanism and pressurizes a brake fluid so as to generate the operation reaction force, a pressure of the brake fluid indexes the operation force, and thus the pressure of the brake fluid can also be utilized as a pilot pressure.

(8) The master cylinder device according to any one of the forms (2)-(7), wherein a space surrounding the transmission rod is sectioned by the separation wall and the input piston so as to define a reaction force chamber having a ring shape and filled with a brake fluid, and the master cylinder device comprises a pressurizing mechanism which includes a pressure accumulating chamber communicating with the reaction force chamber and filled with a brake fluid, and which elastically pressurizes the brake fluid in the pressure accumulating chamber, wherein the operation-reaction-force applying mechanism includes the reaction force chamber and the pressurizing mechanism.

In the embodiment of this form, a limitation regarding the operation-reaction-force applying mechanism is added. According to the above structure, the volume of the reaction force chamber decreases as the input piston moves forward, and the volume increases as the input piston moves rearward. The brake fluid flows into or flows out from the reaction force chamber according to the change of the volume. Therefore, as regards the pressure accumulating chamber communicating with the reaction force chamber, a volume of the brake fluid equal to a volume of the brake fluid flowing into the reaction force chamber flows out, and a volume of the brake fluid equal to a volume of the brake fluid flowing out from the reaction force chamber flows in. That is, in the reaction force chamber and the pressure accumulating chamber, a volume change of one of the chambers accords to a volume change of the other of the chambers. The brake fluid in the pressure accumulating chamber is elastically pressurized by the pressurizing mechanism. Therefore, the input piston is moved forward by a brake operation, and then the brake fluid in the reaction force chamber flows into the pressure accumulating chamber, thereby increasing the volume of the pressure accumulating chamber. Consequently, the pressure of the brake fluid is increased according to the volume increase. Moreover, the pressure of the brake fluid is transmitted to the input piston defining the reaction force chamber. Therefore, the driver can realistically feel that the operation reaction force from the brake operation member increases according to the increase of the brake operation amount. In this master cylinder device, as the pressurizing mechanism, a pressurizing mechanism provided outside the housing, namely, a so-called external type stroke simulator may be employed.

(9) The master cylinder device according to the form (8), wherein the master cylinder device comprises a reaction-force-chamber releasing device for releasing the reaction force chamber to a low pressure source.

In the master cylinder device of this form, when the reaction force chamber is released to the low pressure source, the pressurizing mechanism cannot pressurize the brake fluid, and thus the reaction-force applying mechanism does not function. It is preferable that such a release of the reaction force chamber is carried out in the above mentioned operation-force dependent pressurizing state. That is, where the reaction force chamber is released, the whole of the operation force is utilized for pressurizing the brake fluid in the pressurizing chamber while a part of the operation force is not utilized for pressurizing the brake fluid in the pressurizing mechanism. That is, it is possible to pressurize the brake fluid in the pressurizing chamber with effectively utilizing the operation force, thereby generating the large hydraulic brake force.

(10) The master cylinder device according to the form (9), wherein the reaction-force-chamber releasing device is configured to release the reaction force chamber to the low pressure source in an electric failure condition.

According to the above structure, where the brake fluid is not introduced from the high pressure source into the master cylinder device in the electric failure condition, that is, where the master cylinder device is actuated in the operation-force dependent pressurizing state, as described above, the reaction-force applying mechanism does not function, and thus the brake fluid in the pressurizing chamber is pressurized while the operation force is effectively utilized.

(11) The master cylinder device according to the form (9) or (10), wherein the reaction-force-chamber releasing device includes a reaction-force-chamber communication passage by which the reaction force chamber communicates with the low pressure source, and a normally-opened electromagnetic open/close valve provided on the reaction-force-chamber communication passage.

In the embodiment of this form, a limitation regarding means for releasing the reaction force chamber to the low pressure source in the electric failure condition is added. According to the above structure, since it is possible to release the reaction force chamber to the low pressure source in the electric failure condition, the reaction-force applying mechanism does not function, and thus the brake fluid in the pressurizing chamber is pressurized with the operation force effectively utilized.

BEST MODE FOR CARRYING OUT THE INVENTION

There will be described in detail some embodiments according to the claimable invention with reference to the drawings. It is to be understood, however, that the claimable invention is not limited to the following embodiments and modified embodiment but may be embodied with various changes and modifications on the basis of knowledge of those skilled in the art.

First Embodiment

Structure of Vehicle

Figure 1:
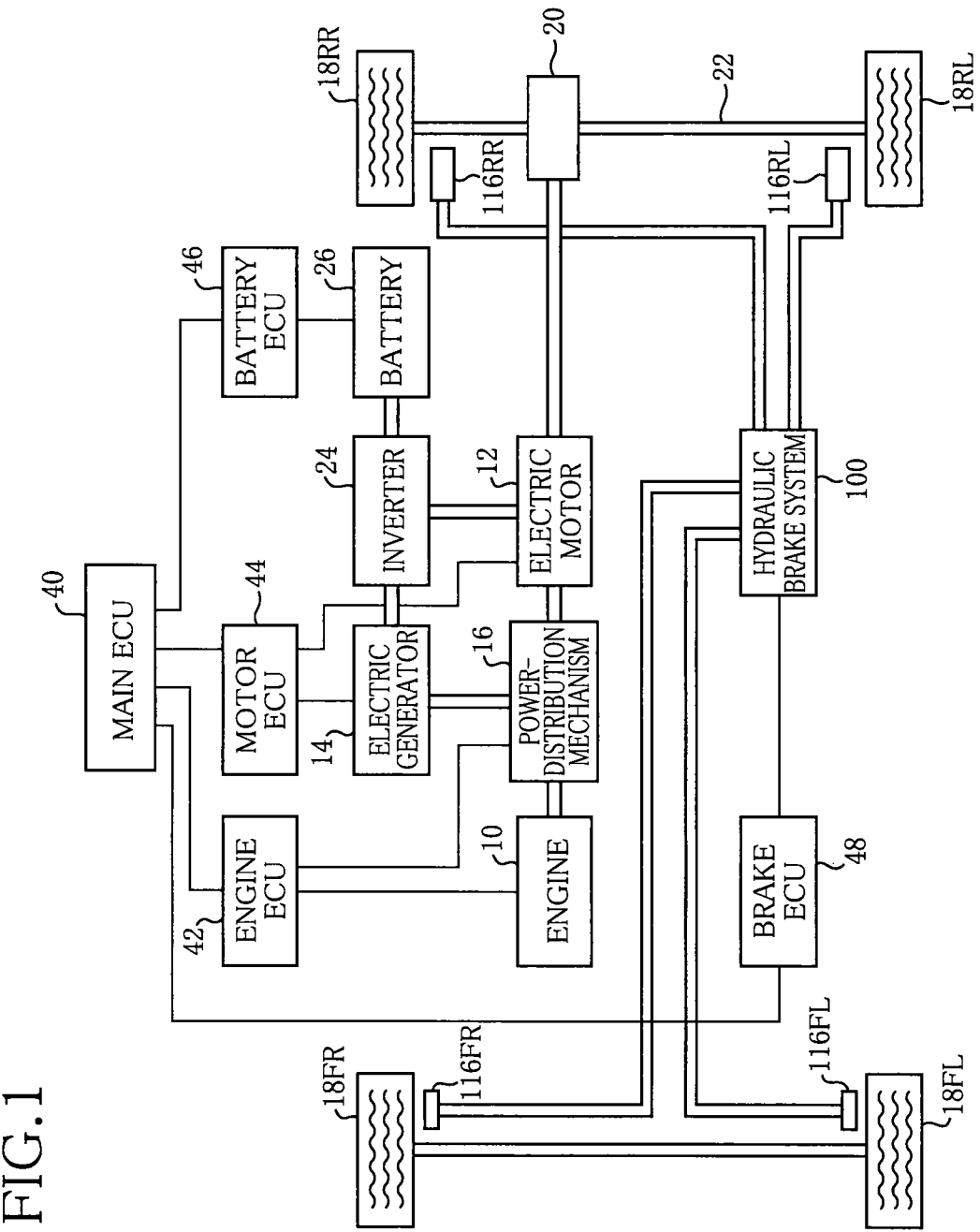
FIG. 1 is a schematic view of a drive system and a brake system of a hybrid vehicle equipped with a master cylinder device of a first embodiment according to the claimable invention.

FIG. 1 schematically illustrates a drive system and a brake system of a hybrid vehicle equipped with a master cylinder device of a first embodiment. The vehicle is equipped with an engine 10 and an electric motor 12 as power sources, and also equipped with an electric generator 14 for generating electricity by an output power of the engine 10. The engine 10, the electric motor 12, and the electric generator 14 are connected to one another via a power-distribution mechanism 16. By controlling the power-distribution mechanism 16, the power of the engine 10 can be divided into a power for driving the electric generator 14 and a power for rotating drive wheels among four wheels 18, and a power of the electric motor 12 can be transmitted to the drive wheels. In other words, the power-distribution mechanism 16 functions as a speed-change mechanism with respect to a driving power which is transmitted to the drive wheels via a speed reducer 20 and a drive shaft 22. It is noted that, while some of components such as the wheels 18 are collectively described, a suitable one of suffixes "FL", "FR", "RL", "RR" respectively indicative of a front left wheel, a front right wheel, a rear left wheel, and a rear right wheel is attached to the numerals of a component element, where it is needed to indicate which one of the four wheels the component corresponds to. According to the description of the suffixes, the drive wheels of the vehicle are the wheel 18RL and the wheel 18 RR.

The electric motor 12 is an alternate current (AC) synchronous motor and is driven by AC electricity. The vehicle is equipped with an inverter 24 which can change electricity of direct current to electricity of alternate current and vice versa. Therefore, by controlling the inverter 24, electricity of alternate current generated by the electric generator 14 can be inverted into electricity of direct current for being charged in a battery 26, and electricity of direct current charged in the battery 26 can be inverted into electricity of alternate current for driving the electric motor 12. The electric generator 14 is constructed as an AC synchronous motor, like the electric motor 12. Accordingly, it may be considered that the vehicle with the present embodiment has two AC synchronous motors. One of them is used as the electric motor 12, to mainly output the driving power, and the other of them is used as the electric generator 14 to mainly generate electricity by using the output power of the engine 10.

The electric motor 12 can also generate (regenerate) electricity by using rotations of the wheels 18RL and 18RR in the vehicle running. In regenerating electricity, the electric motor 12 connected to the wheels 18RL and 18RR generates electricity and a resistance force for restraining a rotation of the electric motor 12. Therefore, it is possible to utilize the resistance force as a brake force for braking the vehicle. That is, the electric motor 12 is utilized as means of a regenerative brake which brakes the vehicle while regenerating electricity. Thus, the vehicle is braked by controlling the regenerative brake as well as an engine brake and a hydraulic brake described below. On the other hand, the electric generator 14 mainly generates electricity by using the output power of the engine 10 and also functions as an electric motor by that electricity is supplied from the battery 26 via the inverter 24.

In the vehicle, a control of the above brakes and various other controls associated with the vehicle are executed by a plurality of electronic control units (ECUs). Among the ECUs, a main ECU 40 has a function for supervising the execution of these controls. For instance, the hybrid vehicle can run by a drive of the engine 10 and a drive of the electric motor 12, which are synthetically controlled by the main ECU 40. Specifically, the main ECU 40 determines a ratio between the output power of the engine 10 and an output power of the electric motor 12, and, on the basis of the ratio, the main ECU 40 sends, to an engine ECU 42 for controlling the engine 10 and a motor ECU 44 for controlling the electric motor 12 and the electric generator 14, commands regarding their respective controls.

A battery ECU 46 for controlling the battery 26 is also connected to the main ECU 40. The battery ECU 46 monitors an electric charge state of the battery 26, and sends a charge-request command to the main ECU 40 when an electric charge amount is short. When the main ECU 40 receives the charge-request command, the main ECU 40 sends, to the motor ECU 44, a command of generating electricity by the electric generator 14 in order to charge the battery 26.

A brake ECU 48 is also connected to the main ECU 40. The vehicle is equipped with a brake operation member (hereinafter, referred to as an "operation member", where appropriate) operated by a driver. The brake ECU 48 determines a target brake force on the basis of at least one of a brake operation amount (hereinafter, referred to as an "operation amount", where appropriate) which is an amount of operation of the operation member and a brake operation force (hereinafter, referred to as an "operation force", where appropriate) which is a force that is applied to the operation member by the driver, and sends the target brake force to the main ECU 40. The main ECU 40 sends the target brake force to the motor ECU 44, and then the motor ECU 44 controls the regenerative brake on the basis of the target brake force and sends, to the main ECU 40, an execution value, that is, a value of the regenerative brake force which is being generated. In the main ECU 40, the regenerative brake force is subtracted from the target brake force, and a target hydraulic brake force which should be generated in a hydraulic brake system 100 provided in the vehicle is determined on the basis of the remainder. The main ECU 40 sends the target hydraulic brake force to the brake ECU 48, and the brake ECU 48 then controls the hydraulic brake system 100 such that a hydraulic brake force generated by the hydraulic brake system 100 becomes equal to the target hydraulic brake force.

<<Structure of Hydraulic Brake System>>

The hydraulic brake system 100 provided in the hybrid vehicle constructed as described above will be explained with reference to FIG. 2. In the following description, the terms "forward" and "rearward" are used to indicate the leftward direction and the rightward direction in FIG. 2, respectively. In addition, the terms "front side", "front end", "forward movement", "rear side", "rear end", "rearward movement", etc. are used for similar indication. Incidentally, in the following explanation, characters enclosed in square brackets [ ] represent sensors etc. in the drawings.

Figure 2:
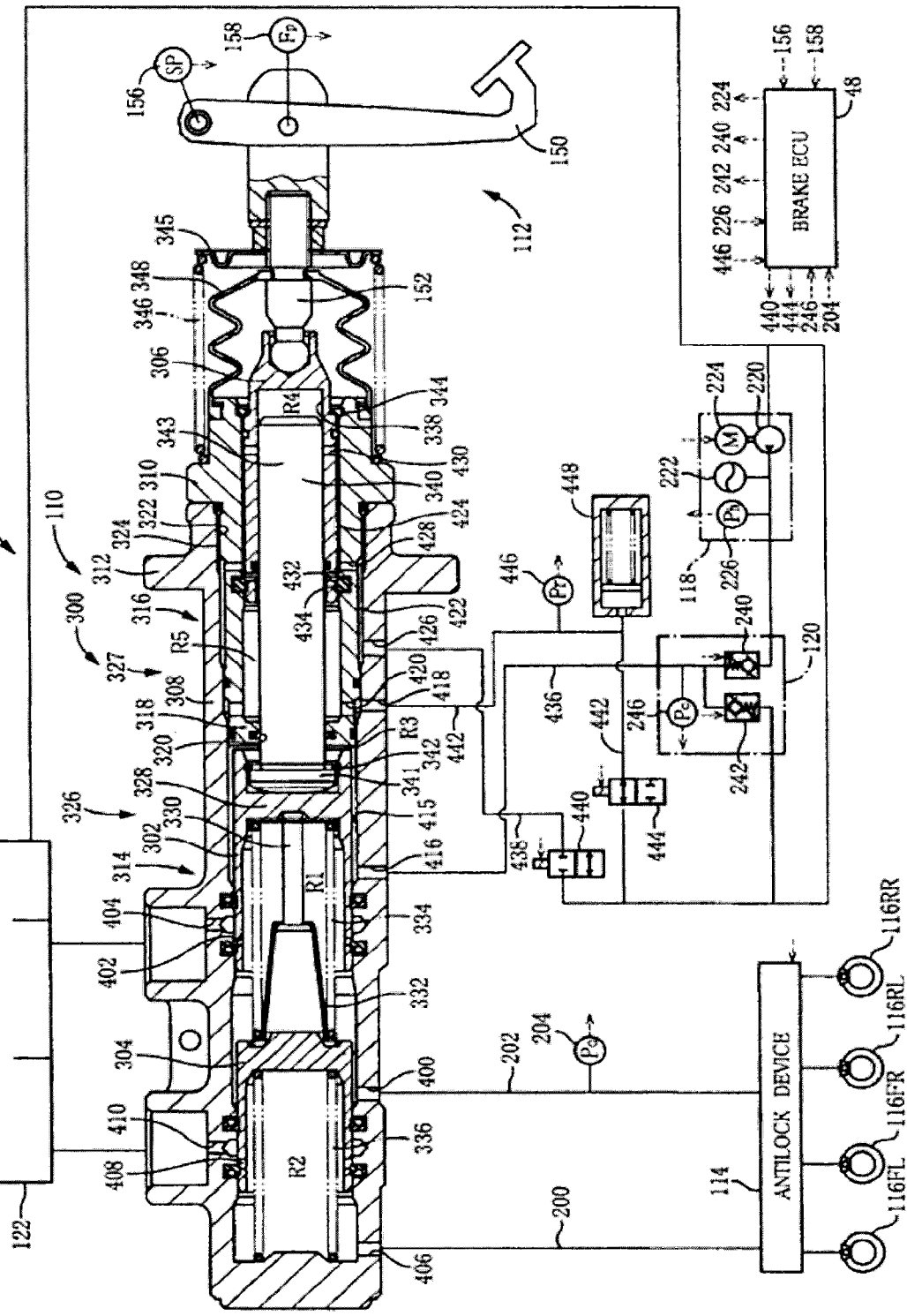
FIG. 2 is a view of a hydraulic brake system including the master cylinder device of the first embodiment according to the claimable invention.

FIG. 2 schematically represents the hydraulic brake system 100 provided in the vehicle. The hydraulic brake system 100 has a master cylinder device 110 for pressurizing a brake fluid. The driver in the vehicle can actuate the master cylinder device 110 by operating an operation device 112 which is connected to the master cylinder device 110. The master cylinder device 110 pressurizes the brake fluid by its actuation. The pressurized brake fluid is supplied to each of brake devices 116 provided in the respective wheels via an antilock device 114 connected to the master cylinder device 110. The brake devices 116 generate respective forces for restraining rotations of the wheels 18, namely, hydraulic brake forces, depending on a pressure of the pressurized brake fluid (hereinafter, referred to as an "output pressure", where appropriate), namely, a master pressure.

The hydraulic brake system 100 has, as a high pressure source, a high-pressure-source device 118 for intensifying a pressure of a brake fluid. The high-pressure-source device 118 is connected to the master cylinder device 110 via a pressure-intensifying/reducing device 120. The pressure-intensifying/reducing device 120 is a device which controls the pressure of the brake fluid intensified by the high-pressure-source device 118 (hereinafter, referred to as a "high-pressure-source pressure", where appropriate) and which intensifies and reduces the pressure of the brake fluid inputted to the master cylinder device 110. This pressure is referred to as an "input pressure", where appropriate. That is, the input pressure is a pressure obtained by controlling the brake fluid of the high-pressure-source pressure, and may be called a controlled high-pressure-source pressure. The master cylinder device 110 is constructed to be able to be actuated according to the intensification and reduction of the input pressure. The hydraulic brake system 100 has a reservoir 122, as a low pressure source, for storing a brake fluid at the atmospheric pressure. The reservoir 122 is connected to the master cylinder device 110, the pressure-intensifying/reducing device 120, and the high-pressure-source device 118.

The operation device 112 includes a brake pedal 150 as an operation member and an operation rod 152 connected to the brake pedal 150. The brake pedal 150 is pivotably held on the body of the vehicle. The operation rod 152 is connected at a rear end portion thereof to the brake pedal 150 and at a front end portion thereof to the master cylinder device 110. The operation device 112 also has an operation amount sensor [SP] 156 for detecting the operation amount of the brake pedal 150 and an operation force sensor [FP] 158 for detecting the operation force. The operation amount sensor 156 and the operation force sensor 158 are connected to the brake ECU 48, which determines the target brake force on the basis of values detected by the sensors.

The brake devices 116 are connected to the master cylinder device 110 via fluid passages 200, 202. The fluid passages 200, 202 are fluid passages for supplying, to the brake devices 116, the brake fluid pressurized to the output pressure by the master cylinder device 110. An output pressure sensor $[P_O]$ 204 (that is a so-called master pressure sensor) is provided on the fluid passage 202. Though detailed description about the brake devices 116 is abbreviated, each of them includes a brake caliper, a wheel cylinder (brake cylinder) and brake pads which are provided in the brake caliper, and a brake disc which rotates together with the corresponding wheel. Each of the fluid passages 200, 202 is connected to the brake cylinder of each brake device 116 via the antilock device 114. Incidentally, the fluid passage 200 is connected to the brake devices 116FL, 116FR for the front wheels, and the fluid passage 202 is connected to the brake devices 116RL, 116RR for the rear wheels. Each of the brake cylinders presses the brake pads onto the brake disk on the basis of the output pressure of the brake fluid pressurized by the master cylinder device 110. In each of the brake devices 116, friction resulting from the press generates the hydraulic brake force for restraining rotation of the corresponding wheel, whereby the vehicle is braked.

The antilock device 114 is a common device and, in short, has four pairs of open/close valves corresponding to the respective wheels. One of the open/close valves of each of the pairs is an open/close valve for pressurizing the brake fluid, and is put in an open state, when the corresponding wheel is not locked. The other of them is an open/close valve for depressurizing the brake fluid, and is put in a close state, when the wheel is not locked. The antilock device 114 is constructed such that, when the wheel is locked, the open/close valve for pressurizing the brake fluid shuts off a flow of the brake fluid from the master cylinder device 110 to the brake devices 116 and the open/close valve for depressurizing the brake fluid allows a flow of the brake fluid from the brake devices 116 to the reservoir, so as to release the lock of the wheel.

The high-pressure-source device 118 includes a hydraulic pump 220 which suctions the brake fluid from the reservoir 122 and intensifies the pressure of the brake fluid, and an accumulator 222 in which the pressure-intensified brake fluid is stored. Incidentally, the hydraulic pump 220 is driven by an electric motor 224. The high-pressure-source device 118 has a high-pressure-source pressure sensor $[P_h]$ 226 for detecting the pressure of the pressure-intensified brake fluid. The brake ECU 48 monitors a value detected by the high-pressure-source pressure sensor 226, and the hydraulic pump 220 is controlled to be driven on the basis of the detected value. Owing to the control, the high-pressure-source device 118 supplies, to the pressure-intensifying/reducing device 120, the brake fluid having a pressure of a predetermined pressure or more at all times.

The pressure-intensifying/reducing device 120 includes an electromagnetic pressure-intensifying linear valve 240 for intensifying the input pressure and an electromagnetic pressure-reducing linear valve 242 for reducing the input pressure. The pressure-intensifying linear valve 240 is provided on a fluid passage extending from the high-pressure-source device 118 to the master cylinder device 110, while the pressure-reducing linear valve 242 is provided on a fluid passage extending from the reservoir 122 to the master cylinder device 110. Incidentally, on the fluid passages, respective portions from the pressure-intensifying linear valve 240 and the pressure-reducing linear valve 242 to the master cylinder device 110 are integrated into a single fluid passage to be connected to the master cylinder device 110. In addition, on the integrated fluid passage, there is provided an input pressure sensor $[P_C]$ 246 for detecting the input pressure. The brake ECU 48 controls the pressure-intensifying/reducing device 120 on the basis of a value detected by the input pressure sensor 246.

The pressure-intensifying linear valve 240 is maintained in a close state in which electric current is not supplied thereto, that is, in a not-energized state. When the pressure-intensifying linear valve 240 is supplied with electric current, that is, put into an energized state, the valve 240 opens at a valve-opening pressure which is determined in accordance with the supplied electric current. Incidentally, the pressure-intensifying linear valve 240 is constructed such that the larger the supplied electric current is, the higher the valve-opening pressure is. On the other hand, the pressure-reducing linear valve 242 is maintained in an open state in which electric current is not supplied thereto. In a normal condition, that is, a condition in which electric current can be supplied to the system, the pressure-reducing linear valve 242 is supplied with the maximum electric current in a predetermined range so as to be maintained in a close state. When the supplied electric current is reduced, the valve 242 opens at a valve-opening pressure which is determined in accordance with the supplied electric current. Incidentally, the pressure-reducing linear valve 242 is constructed such that the smaller the supplied electric current is, the lower the valve-opening pressure is.

<<Structure of Cylinder Device>>

The master cylinder device 110 includes a housing 300 which is a casing of the master cylinder device 110, a first pressurizing piston 302 and a second pressurizing piston 304 which pressurize the brake fluid to be supplied to the brake devices 116, and an input piston 306 to which the operation of the driver is inputted via the operation device 112. Incidentally, FIG. 2 shows a state in which the master cylinder device 110 is not actuated, that is, a brake operation is not performed. It is noted that the master cylinder device 110 has, inside thereof, several fluid chambers for accommodating brake fluid, several communication passages for communications between some of the fluid chambers, and several communication passages for communications between some of the fluid chambers and the exterior. Therefore, several seals are provided between components so as to securely close the fluid chambers and the communication passages. Since the seals are common products, in the interest of brief description of the specification, description regarding the seals is abbreviated except that it is considered necessary.

The housing 300 mainly includes two members, specifically, a first housing member 308 and a second housing member 310. The first housing member 308 has a shape like a cylinder, on the whole, whose front end portion is closed, and includes a flange 312 formed on an outer periphery of a rear end portion of the housing member 308. The first housing member 308 is mounted on the body of the vehicle at the flange 312. The first housing member 308 is sectioned into two portions having mutually different inner diameters, specifically, a front small-diameter portion 314 arranged in a front side and having a small inner diameter, and a rear large-diameter portion 316 arranged in a rear side and having a large inner diameter.

The second housing member 310 includes a front end portion 318 having a flange projecting for an inner side, and a through hole 320 being through the flange in a center area of the front end portion 318. In addition, the second housing member 310 includes a part of an outer peripheral portion which serves as a male screw portion 322 on which a thread is formed, whereas the first housing member 308 includes a rear end portion on an inner periphery of the rear large-diameter portion 316 which serves as a female screw portion 324 to be engaged with the male screw portion 322. That is, the second housing member 310 is unified with the first housing member 308 while the second housing member 310 is screwed into the inside of the first housing member 308 from a rear end thereof. A transmission rod described below is inserted into the through hole 320 of the second housing member 310. Accordingly, the housing 300 has a shape in which the front end portion 318 of the second housing member 310 functions as a separation wall, and thus the inside of the housing 300 is separated into a front side chamber 326 and a rear side chamber 327.

The second pressurizing piston 304 has a shape like a cylinder whose rear end portion is closed. The second pressurizing piston 304 is slidably fitted in the front small-diameter portion 314 of the first housing member 308. The first pressurizing piston 302 has a shape like a cylinder on the whole, however the inside thereof is sectioned into two portions by a partition wall portion 328. That is, the first pressurizing piston 302 has a shape that has two blind holes being open at a front end and a rear end thereof, respectively. In front of the first pressurizing piston 302 and between the first pressurizing piston 302 and the second pressurizing piston 304, there is defined a first pressurizing chamber R1 for pressurizing the brake fluid to be supplied to the brake devices 116RL, RR provided in the two rear wheels. And in front of the second pressurizing piston 304, there is defined a second pressurizing chamber R2 for pressurizing the brake fluid to be supplied to the brake devices 116FL, FR provided in the two front wheels. Incidentally, a distance in which the first pressurizing piston 302 and the second pressurizing piston 304 separate from each other is limited so as to be within a predetermined range by a headed pin 330 screwed vertically on a front side face of the partition wall portion 328 of the first pressurizing piston 302 and a pin-retaining tube 332 fixed on a rear end face of the second pressurizing piston 304. In the first pressurizing chamber R1 and the second pressurizing chamber R2, compression coil springs (hereinafter, referred to as a "return springs", where appropriate) 334, 336 are disposed, respectively. Those springs bias the first pressurizing piston 302 and the second pressurizing piston 304 in directions that the pistons 302, 304 separate away from each other and bias the pistons 302, 304 rearward. Incidentally, a rearward movement of the first pressurizing piston 302 is limited by that the rear end thereof comes into abutting contact with a front end face of the second housing member 310. In addition, between the rear end of the first pressurizing portion 302 and the front end face of the second housing member 310, there is defined a fluid chamber R3 into which the pressure of the high-pressure-source device 118 is inputted. This fluid chamber R3 is referred to as an "input chamber", where appropriate. It is noted that the input chamber R3 is depicted in an almost squeezed state in FIG. 2.

The input piston 306 has a shape like a cylinder whose rear end portion is closed and which has a blind hole 338 being open forward. The input piston 306 is fitted in the second housing member 310 while slidably contacting with an inner periphery of the second housing member 310. In the blind hole being open rearward of the first pressurizing piston 302, a transmission rod 340 extending rearward and being like a bar is fixedly fitted. More specifically, a proximal end portion 341 of the transmission rod 340 is fitted in the blind hole being open rearward of the first pressurizing piston 302 and fixed by a stopper ring 342. Therefore, a relative movement of the transmission rod 340 to the first pressurizing piston 302 in the forward and rearward direction is prohibited. Incidentally, the transmission rod 340 is allowed to rotate around its axis. Moreover, the transmission rod 340 is disposed such that it is through the front end portion 318 of the second housing member 310, that is, the through hole 320 of the separation wall, and a distal end portion 343 of the transmission rod 340 slidably contacts with an inner periphery of the bind hole 338 of the input piston 306. In addition, the transmission rod 340 is provided such that a distal end portion 343 arranged in a rear side of the transmission rod 340 and a bottom portion of the blind hole 338 are away from each other when a brake operation is not performed. In other words, a fluid chamber R4 is defined inside the input piston 306 by the blind hole 338 and the transmission rod 340. This chamber is referred to as an "inter-piston chamber", where appropriate. In addition, in front of the input piston 306 and in a space surrounding the transmission rod 340, a ring-shaped fluid chamber R5 is defined by a front end face of the input piston 306 and the inner periphery of the second housing member 310. This chamber is referred to as a "reaction force chamber", where appropriate.

A front end portion of the operation rod 152 is connected to the rear end portion of the input piston 306 so as to transmit, to the input piston 306, the operation force applied to the brake pedal 150 and so as to move the input piston 306 forward and rearward in accordance with the operation amount of the brake pedal 150. Incidentally, the input piston 306 is limited in moving rearward by being stopped by a stopper ring 344 fitted in a rear end of an inner peripheral portion of the second housing member 310. In addition, a spring seat 345 shaped like a disc is fixed to the operation rod 152, and a compression coil spring (hereinafter, referred to as a "return spring", where appropriate) 346 is disposed between a spring seat 345 and the second housing member 310. The return spring 346 biases the operation rod 152 rearward. Incidentally, a rear end portion of the second housing member 310 and the front end portion of the operation rod 152 are covered by a boot 348, whereby a rear portion of the master cylinder device 110 is protected from dust.

The first pressurizing chamber R1 communicates with the fluid passage 202 connected to the antilock device 114 through a communication hole 400 whose opening is an output port, and communicates with the reservoir 122 through a communication hole 402 provided in the first pressurizing piston 302 and a communication hole 404 whose opening is a drain port while being allowed not to communicate with the reservoir 122. On the other hand, the second pressurizing chamber R2 communicates with the fluid passage 200 connected to the antilock device 114 through a communication hole 406 whose opening is an output port, and communicates with the reservoir 122 through a communication hole 408 provided in the second pressurizing piston 304 and a communication hole 410 whose opening is a drain port while being allowed not to communicate with the reservoir 122.

An inner diameter of the first housing member 308 is slightly larger at a rear side portion thereof than an outer diameter of the first pressurizing piston 302. Therefore, between an inner periphery of the first housing member 308 and an outer periphery of the first pressurizing piston 302, there is formed a fluid passage 415 which has a certain cross section area through which a brake fluid can flow and whose rear end is connected to the input piston 306. The first housing member 308 has a communication hole 416 whose one end is a communication port being open to the exterior and whose other end is open to the fluid passage 415. Therefore, the input chamber R3 is communicated with the exterior through the fluid passage 415. In addition, the first housing member 308 has a communication hole 418 whose one end is a communication port being open to the exterior and whose other end is open to the inner periphery of the first housing member 308. The second housing member 310 has a communication hole 420 whose one end is open so as to face the opening at the other end of the communication hole 418 and whose other end is open to the reaction force chamber R5. Accordingly, the reaction force chamber R5 communicates with the exterior through the communication holes 418, 420.

An intermediate portion of the second housing member 310 has an outer diameter somewhat smaller than an inner diameter of the rear large diameter portion of the first housing member 308. Therefore, Between an outer periphery of the second housing member 310 and the inner periphery of the first housing member 308, there is formed a fluid passage 422 having a certain cross section area through which a brake fluid can flow. In addition, the intermediate portion of the second housing member 310 has an inner diameter somewhat larger than an outer diameter of the input piston 306. Therefore, Between the inner periphery of the second housing member 310 and an outer periphery of the input piston 306, there is formed a fluid passage 424 having a certain cross section area through which a brake fluid can flow. The first housing member 308 has a communication hole 426 whose one end is a communication port being open to the exterior and whose other end is open to the fluid passage 422. In addition, the second housing member 310 has a communication hole 428 whose one end is open to the fluid passage 422 and whose other end is open to the fluid passage 424. Accordingly, the inter-piston chamber R4 communicates with the exterior through a communication hole 430, the fluid passage 424, the communication hole 428, the fluid passage 422, and the communication hole 426.

The input piston 306 has a communication hole 432 at the front thereof whose one end is open to the reaction force chamber R5 and whose other end is open to the outer periphery of the input piston 306. In a state in which a brake operation is not performed, the opening of the communication hole 432 is positioned behind a seal member 434, and thus the communication hole 432 and the communication hole 428 communicate with each other. In this state, the reaction force chamber R5 communicates with the exterior through the communication hole 432, the communication hole 428, the fluid passage 422, and the communication hole 426. However, when a brake operation is performed, that is, the input piston 306 is moved forward, the seal member 434 embedded in the inner periphery of the second housing member 310 shuts off the communication between the communication hole 432 and the communication hole 428, whereby the communication between the reaction force chamber R5 and the exterior is shut off.

In the master cylinder device 110 thus having the communication holes and the fluid passages, an input pressure introduction passage 436 for introducing the brake fluid of the input pressure into the input pressure chamber R3 is connected at one end thereof to the pressure-intensifying/reducing device 120 and at the other end thereof to the connection port of the communication hole 416.

An external communication passage 438 is connected at one end thereof to the reservoir 122 and at the other end thereof to the connection port of the communication hole 426. In the middle of the external communication passage 438, an electromagnetic open/close valve 440 is provided, and thus the inter-piston chamber R4 can communicate with the reservoir 122. Incidentally, the open/close valve 440 is a normally-closed valve that comes into a close state when not-energized, and is opened and closed respectively by a supply and a not-supply of electricity by the brake ECU 48 functioning as a valve controller. Thus, in the master cylinder device 110, the external communication passage 438 constitutes an inter-piston-chamber communication passage through which the inter-piston chamber R4 communicates with the reservoir 122, and the open/close valve 440 and the brake ECU 48 constitutes an inter-piston-chamber hermetically-closing device which shuts off the inter-piston-chamber communication passage, thereby hermetically closing the inter-piston chamber R4.

It is noted that, when the inter-piston-chamber communication passage is not shut off and a brake operation is not performed, the reaction force chamber R5 communicates with the reservoir 122 through the external communication passage 438. In the master cylinder device 110, so to speak, the communication hole 432 and the seal member 434 constitute a low-pressure-source communication mechanism for securing the communication of the reaction force chamber R5 with the reservoir 122 in a brake operation not performed.

An external communication passage 442 is connected at one end thereof to the reservoir 122 and at the other end thereof to the connection port of the communication hole 416. In the middle of the external communication passage 442, an electromagnetic open/close valve 444 is provided, and thus the reaction force chamber R5 can communicate with the reservoir 122. Incidentally, the open/close valve 444 is a normally-opened valve that comes into an open state when not-energized, In the middle of the external communication passage 442, there is provided a reaction-force-chamber pressure sensor [Pr] 446 for detecting a pressure of a brake fluid in the reaction force chamber R5. The brake ECU 48 monitors a detected value of the reaction-force-chamber pressure sensor. The open/close valve 444 is opened and closed on the basis of the detected value. Thus, in the master cylinder device 110, the external communication passage 442 constitutes a reaction force chamber communication passage, and the external communication passage 442 and the open/close valve 444 constitute a reaction-force-chamber releasing device. In addition, between the communication hole 418 and the open/close valve 444 in the external communication passage 442, there is provided a stroke simulator 448 into which the brake fluid in the reaction force chamber R5 flows and from which the brake fluid flows into the reaction force chamber R5.

Figure 3:
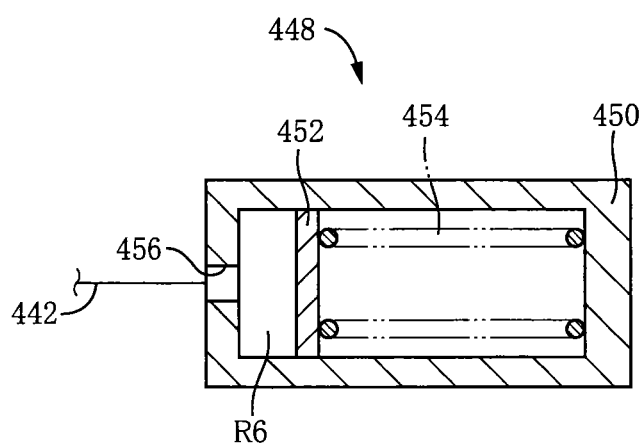
FIG. 3 is a view of the reaction force applying mechanism employed in the master cylinder device of the first embodiment.

FIG. 3 is a cross sectional view of the stroke simulator 448. The stroke simulator includes a housing 450 being a casing, and a pressurizing piston 452 and a compression coil spring 454 which are disposed inside the housing 450. The housing 450 has a shape like a cylinder whose both ends are closed. The pressurizing piston 452 is shaped like a disk and disposed such that the pressurizing piston 452 can slidably contact with an inner periphery of the housing 450. As regards the spring 454, its one end is supported by an inner bottom face of the housing 450 and the other end is supported by one end face of the pressurizing piston 452. Accordingly, the pressurizing piston 452 is elastically supported by the housing 450 with using the spring 454. Inside the housing 450, a pressure accumulation chamber R6 is defined by the other end face of the pressurizing piston 452 and the housing 450. That is, a brake fluid in the pressure accumulation chamber R6 is elastically pressurized by the spring 454, whereby the stroke simulator 448 functions as a pressurizing mechanism for elastically pressurizing the brake fluid in the pressure accumulation chamber R6. Moreover, in the housing 450, there is provided a communication hole 456 whose one end is open to the pressure accumulation chamber R6 and whose other end is a connection port. To the connection port of the communication hole 456, a communication passage diverging from the external communication passage 442 is connected. Therefore, the pressure accumulation chamber R6 communicates with the internal chamber R5, and thus the brake fluid in the reaction force chamber R5 can also be elastically pressurized by the compression coil spring 454. Accordingly, the stroke simulator 448 can pressurizes the brake fluid in the reaction force chamber R5, and serves as an operation-reaction-force applying mechanism for generating a force directing the input piston 306 rearward, namely, an operation reaction force against a brake operation.

By the way, a stroke simulator employed in the master cylinder device 110 may be a so-called diaphragm type stroke simulator. That is, a stroke simulator in which the pressure accumulation chamber R6 is defined by not the pressurizing piston 452 but a diaphragm and the brake fluid is pressurized by the pressurizing mechanism via the diaphragm, may be employed.

<<Actuation of Master Cylinder Device>>

The following explanation is regarding actuation of the master cylinder device 110. In the normal condition, that is, a condition in which the hydraulic brake system 100 can be actuated normally, the open/close valve 444 is energized to be closed. Accordingly, when the driver begins to press the brake pedal 150 and the input piston 306 is moved forward by the brake operation force, the brake fluid in the reaction force chamber R5 flows into the pressure accumulation chamber R6 of the stroke simulator 448. Since a volume of the pressure accumulation chamber R6 increases according to the forward movement, an elastic force of the spring 454 increases. That is, a pressure of the brake fluid in the pressure accumulation chamber R6 and the reaction force chamber R5 increases. A pressure of the brake fluid acts on the input piston 306, and thus in turn serves as the operation reaction force against the forward movement of the input piston 306, that is, the brake operation. Additionally, in the normal condition, since the open/close valve 440 is energized to be opened, the inter-piston chamber R4 communicates with the reservoir 122. Therefore, even when the input piston 306 is moved forward, the operation force is not transmitted to the first pressurizing piston 302 via the brake fluid in the inter-piston chamber R4.

Figure 4:
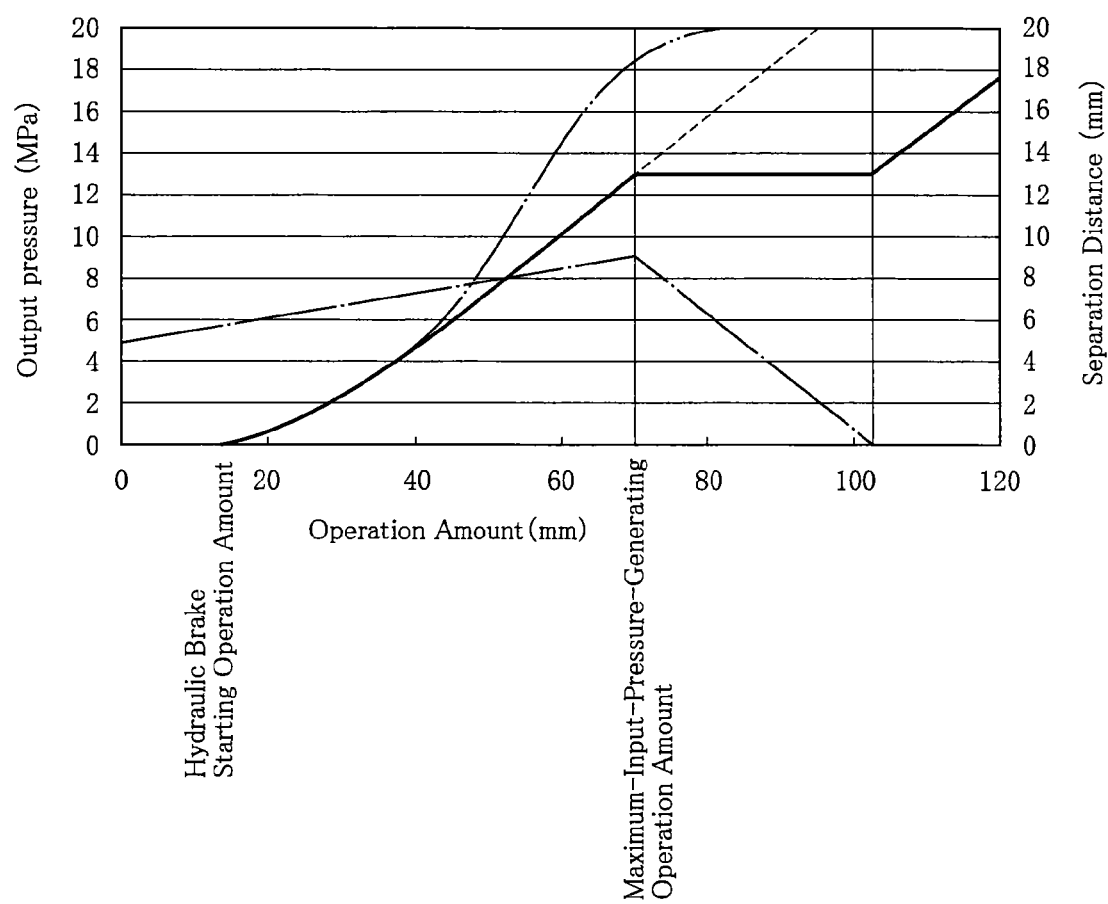
FIG. 4 is a graph which illustrates a relation between the brake operation amount and the output pressure, and a relation between the brake operation amount and a distance from the distal end portion of the transmission rod to the other of the input piston and the pressurizing piston.

FIG. 4 shows, by a solid line, a variation of the pressure of the first pressurizing chamber R1, namely, the output pressure with respect to the operation amount of the brake pedal 150. In addition, FIG. 4 shows, by an alternate long and short dash line, a distance between the bottom portion of the blind hole 338 and the distal end portion 343 of the transmission rod 340, namely, a separation distance with respect to the operation amount. As described before, in the vehicle equipped with the master cylinder device 110, since the brake force is generated by the regenerative brake in at a comparatively early stage of a brake operation, the hydraulic brake force is not required. Generation of the hydraulic brake force can be achieved by introducing the brake fluid from the high-pressure-source device 118 into the input chamber R3. The introduction of the brake fluid is started at an operation amount determined in consideration of the brake force of the regenerative brake (a hydraulic brake starting operation amount shown in the FIG. 4). When the brake fluid is introduced into the input chamber R3, the first pressurizing piston 302 moves forward depending on only the pressure of the brake fluid, thereby pressurizing the brake fluid in the first pressurizing chamber R1. Then, the second pressurizing piston 304 moves forward in turn depending on the pressure of the brake fluid in the first pressurizing chamber R1, thereby pressurizing the brake fluid in the second pressurizing chamber R2. Accordingly, the master cylinder device 110 is actuated in a high-pressure-source pressure dependent pressurizing state in which the master cylinder device 110 pressurizes the brake fluid depending on only the high-pressure-source pressure, and thus the pressurized brake fluid is supplied to each of the brake devices 116 via the anti-lock device 114, whereby each of the brake devices 116 generates the hydraulic brake force. It is noted that, since the pressure-intensifying/reducing device 120 is controlled to intensify the input pressure according to an increase of the operation amount, the output pressure also increases according to the increase of the operation amount. In addition, the master cylinder device 110 is constructed such that a ratio of a pressure increase of the input chamber R3 with respect to an increase of the operation amount is comparatively large. In other words, the pressure of the input chamber R3 is controlled such that a forward movement amount of the first pressurizing piston 302 becomes larger than a forward movement amount of the input piston 306. Therefore, the separation distance increases as the operation amount increases.

In the master cylinder device 110 actuated thus in the high-pressure-source pressure dependent pressurizing state, at a moment when the brake fluid of the pressure intensified by the high-pressure-source device 118 is introduced into the input chamber R3 without being reduced by the pressure-intensifying/reducing device 120, the input pressure and the high-pressure-source pressure become equal. Therefore, since the input pressure cannot become larger than the high-pressure-source pressure, the first pressurizing piston 302 cannot move forward depending on the input pressure for a brake operation after the moment, and thus the hydraulic brake force cannot increase. Accordingly, the hydraulic brake force depending on the high-pressure-source pressure becomes the maximum at an operation amount at the moment (a maximum-input-pressure-generating operation amount shown in FIG. 4).

On the other hand, for a brake operation beyond the maximum-input-pressure-generating operation amount, the separation distance decreases since the first pressurizing piston 302 does not move forward. After a moment when the separation distance becomes zero, that is, the distal end portion 343 of the transmission rod 340 comes into abutting contact with the bottom portion of the blind hole 338, the output pressure increases for a brake operation. In other words, since the pressurizing pistons 302, 304 are moved forward by the operation force in addition to a force generated by the input pressure, the output pressure becomes larger than the output pressure at the maximum-input-pressure-generating operation amount. That is, the master cylinder device 110 is actuated in a high-pressure-source-pressure/operation-force dependent pressurizing state in which the brake fluid in the pressurizing chambers is pressurized depending on not only the pressure of the brake fluid from the high pressure source but also the operation force, whereby each of the brake devices 116 generates the hydraulic brake force larger than that in the high-pressure-source-pressure dependent pressurizing state. Therefore, the master cylinder device 110 can employ a comparatively small high pressure source device 118, thereby reducing an installation space and a cost of the high pressure source device 118.

In addition, the master cylinder device 110 can shift from the high-pressure-source-pressure dependent pressurizing state to the high-pressure-source-pressure/operation-force dependent pressurizing state before the above separation distance becomes zero. Specifically, even when the distal end portion 343 of the transmission rod 340 does not abut on the bottom portion of the blind hole 338 of the input piston 306, the open/close valve 440 is de-energized to be closed, and thus the inter-piston chamber R4 is hermetically closed, whereby the operation force is transmitted to the first pressurizing piston 302 via the brake fluid in the inter-piston chamber R4. Therefore, after a moment when the inter-piston chamber R4 is hermetically closed, the master cylinder device 110 can be actuated in the high-pressure-source-pressure/operation-force dependent pressurizing state, and thus each of the brake devices 116 generates the large hydraulic brake force. For example, where the open/close valve 440 is closed at a moment when the input pressure becomes equal to the high-pressure-source pressure, the output pressure increases smoothly with respect to an increase of the operation amount, as shown by a dashed line in FIG. 4. Therefore, the driver can perform a brake operation without sensing unfavorable feeling in a change of the brake force with respect to the operation amount.

In a case that a large brake force is required, such as a case of an emergency brake, the inter-piston chamber R4 may be hermetically closed irrespective of the input pressure. In the master cylinder device 110, the brake ECU 48 detects the operation amount and always monitors a change speed of the operation amount. Therefore, when the change speed of the operation amount suddenly increases, the brake ECU 48 determines that an emergency brake is performed, and then the open/close valve 440 may be closed. Where the open/close valve 440 is closed, the output pressure becomes higher than the output pressure in the high-pressure-source-pressure dependent pressurizing state as shown by an alternate long and two short dashes line in FIG. 4. Therefore, comparatively large hydraulic brake force is generated in a small operation amount, that is, comparatively large hydraulic brake force is generated swiftly.

Next, the following explanation is regarding actuation of the master cylinder device 110 under a condition in which electricity is not supplied to the hydraulic brake system 100 due to an electric failure. Under this condition, since the open/close valve 440 is closed, the communication of the inter-piston chamber R4 with the reservoir 122 is shut off, and thus the inter-piston chamber R4 is hermetically closed. Accordingly, the operation force is transmitted to the first pressurizing piston 302 via the brake fluid in the hermetically closed inter-piston chamber R4, consequently, the brake fluid in the pressurizing chambers R1, R2 are pressurized. In other words, in the master cylinder device 110, a state in which the brake fluid in the pressurizing chambers R1, R2 are pressurized depending on only the operation force, namely, an operation force dependent pressurizing state is realized where the high pressure source device 118 cannot supply the pressure intensified brake fluid.

On the other hand, the open/close valve 444 is not-energized to be opened, and thus the reaction force chamber R5 communicates with the reservoir 122. Accordingly, when the driver begins to press the brake pedal 150, the input piston 306 moves forward with the brake fluid in the reaction force chamber R5 flowing into the reservoir 122. Hence, the compression coil spring 454 cannot pressurize the brake fluid in the accumulation chamber R6. Consequently, since the operation force is not utilized for pressurizing the brake fluid in the reaction force chamber R5 and the pressure accumulation chamber R6, the brake fluid in the pressurizing chambers R1, R2 can be pressurized by effectively utilizing the operation force. It is noted that the stroke simulator 448 does not generate the operation reaction force, however the driver can realistically feel the reaction force generated by the pressure of the brake fluid in the pressurizing chambers R1, R2, as the operation reaction force.

Modified Embodiment

Figure 5:
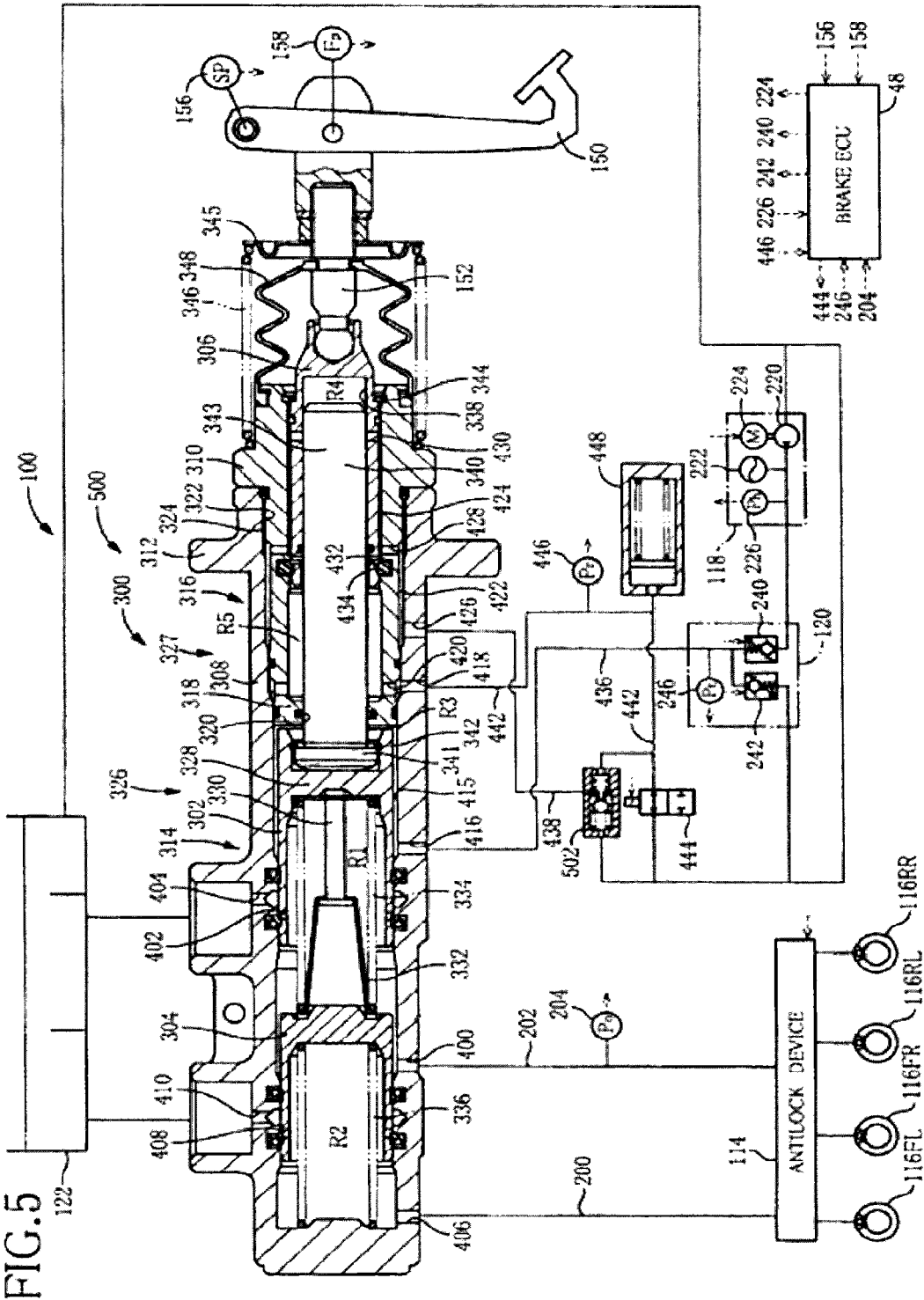
FIG. 5 is a view of a hydraulic brake system including a master cylinder device of a modified embodiment of the first embodiment.

FIG. 5 shows the hydraulic brake system 100 having a master cylinder device 500 of a modified embodiment substituting for the master cylinder device 110 of the first embodiment. Generally speaking, the master cylinder device 500 has the same structure as the master cylinder device 110 of the first embodiment except for having a mechanical open/ close valve 502 substituting for the electromagnetic open/close valve 440 provided in the middle of the external communication passage 438 of the master cylinder device 110 of the first embodiment. In the following explanation, centering on the open/close valve 502, only structure and actuation different from the master cylinder device 110 of the first embodiment are explained.

Figure 6:
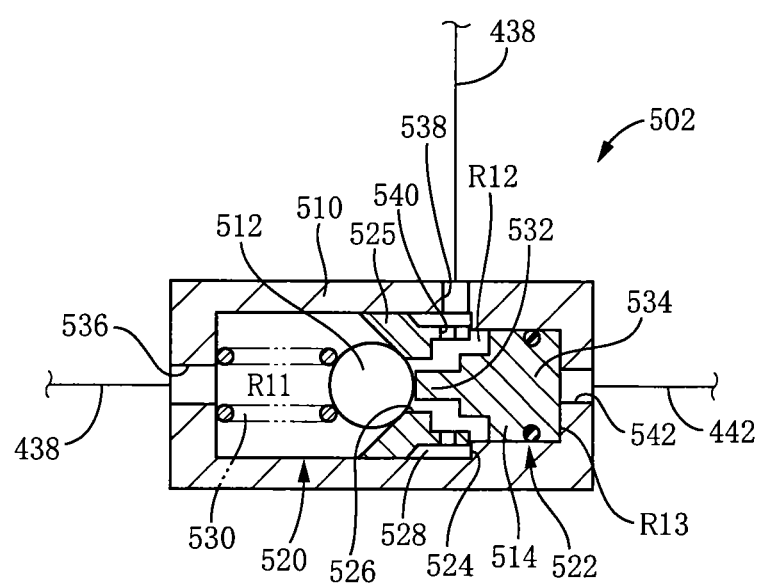
FIG. 6 is a view of the mechanical open/close valve employed in the master cylinder device of the modified embodiment of the first embodiment.

The open/close valve 502 is provided in the middle of the external communication passage 438. FIG. 6 is a cross sectional view of the open/close valve 502. The open/close valve 502 includes a housing 510 which is a casing, and a valve body member 512 and a plunger 514 which are disposed inside the housing 510. The housing 510 has a shape like a cylinder whose both ends are closed. Inside the housing 510, there are formed a large inner diameter portion 520 having a large inner diameter and a small inner diameter portion 522 having a small inner diameter. In a border between the diameter portions 520 and 522, there is formed a stepping face 524. In the large inner diameter portion 520 of the housing 510, there is fixedly fitted a separation member 525 having a roughly cylindrical shape with the separation member 525 abutting on the stepping face 524. It is noted that there is provided a communication hole 526 in the center of the separation member 525. A part of the separation member 525 which is on an outer periphery thereof and close to the stepping face 524, has a small outer diameter. Therefore, between the large inner diameter portion 520 of the housing 510 and the separation member 525, there is provided a clearance 528.

In the large inner diameter portion 520 of the housing 510, there is defined a fluid chamber R11 by the large inner diameter portion 520 and the separation member 525. In the fluid chamber R11, there are disposed the valve body member 512 having a spherical shape and a compression coil spring 530. The valve body member 512 is pushed onto the communication hole 526 by an elastic reaction force of the spring 530 so as to close the communication hole 526. It is noted that a diameter of the valve body member 512 is larger than a diameter of the communication hole 526. Therefore, the separation member 525 functions as a valve seat, and thus the valve body member 512 can sit on the separation member 525, thereby closing the communication hole 526. In this state, the open/close valve 502 is in a close state. In the small inner diameter portion 522 of the housing 510, the plunger 514 having a roughly cylindrical shape is disposed. As regards the plunger 514, its one end is a tip portion 532 whose outer diameter is smaller than the diameter of the communication hole 526, and its other end is a bottom portion 534 whose outer diameter is slightly smaller than the inner diameter of the small inner diameter portion 522. Therefore, the plunger 514 is fitted in the inside of the housing 510 with the bottom portion 534 slidably contacting with the small inner diameter portion 522. Additionally, in front of the plunger 514, there is defined a fluid chamber R12 by the small inner diameter portion 522, the separation member 525, and the plunger 514, and in the rear of the plunger 514, there is defined a pilot pressure chamber R13 by the small inner diameter portion 522 and the plunger 514 into which a brake fluid is introduced as a pilot pressure described below. It is noted that the pilot pressure chamber R13 is depicted in an almost squeezed state in FIG. 6. In addition, the fluid chamber R12 can communicate with the fluid chamber R11 through the communication hole 526.

In the large inner diameter portion 520 of the housing 510, there is provided a communication hole 536 whose one end is open to the fluid chamber R11 and whose other end is a connection port. In the vicinity of the stepping face 524 of the large inner diameter portion 520, there is provided a communication hole 538 whose one end is open to the clearance 528 and whose other end is a connection port. Moreover, in the separation member 525, there is provided a communication hole 540 for a communication between the clearance 528 and the fluid chamber R12. Furthermore, in the small inner diameter portion 522 of the housing 510, there is provided a communication hole 542 whose one end is open to the pilot pressure chamber R13 and whose other end is a connection port.

The above constructed open/close valve 502 is connected to the external communication passage 438 at the respective connection ports of the communication holes 536, 538. That is, it is possible to say that the communication hole 536, the fluid chambers R11, R12, the communication hole 540, the clearance 528, and the communication hole 538 constitute a part of the external communication passage 438. Through the external communication passage 438, the inter-piston chamber R4 of the master cylinder device 500 can communicate with the reservoir 122. In addition, since a communication passage diverging from the external communication passage 442 is connected to the connection port of the communication hole 542, a brake fluid having the same pressure as the brake fluid in the reaction force chamber R5 is supplied to the communication hole 542. Therefore, the tip portion 532 of the plunger 514 can advance through the communication hole 526 according to the pressure of the brake fluid in the reaction force chamber R5, whereby the plunger 514 can be activated to push the valve body member 512. When a force for pushing the valve body member 512 becomes larger than a force of the compression spring 530 for pushing the valve body member 512, the plunger 514 can separate the valve body member 512 from the communication hole 526. In this state, the open/close valve 502 is in an open state, whereby the inter-piston chamber R4 communicates with the reservoir 122. That is, the open/close valve 502 is constructed to be activated using the brake fluid in the reaction force chamber R5, as the pilot pressure.

The following explanation is regarding actuation of the master cylinder device 500. In the normal condition, the open/close valve 444 is energized to be in the close state, whereby the reaction force chamber R5 is hermetically closed. When the brake operation force increases in this state, the pressure in the reaction force chamber R5 increases. Accordingly, in the open/close valve 502, the valve body member 512 separates away from the communication hole 526. Therefore, the open/close valve 502 comes into the open state. In other words, a state in which the fluid chamber R11 and the fluid chamber R12 communicate with each other, that is, a state in which the inter-piston chamber R4 communicates with the reservoir 122 is realized. Thus, in the normal condition, the master cylinder device 500 can be actuated in the high-pressure-source-pressure dependent pressurizing state. On the other hand, as the operation force is decreased, the pressure of the brake fluid in the reaction force chamber R5 is decreased. Then, the pressure becomes lower than a predetermined value of an approximately atmospheric pressure, and thus the open/close valve 502 is closed. That is, the open/close valve 502 opens and closes using the pressure of the brake fluid in the reaction force chamber R5 indexing the operation force, as the pilot pressure. Thus, in the master cylinder device 500, the inter-piston-chamber hermetically-closing device is constructed with a comparatively simple mechanism.

In the open/close valve 502 of the master cylinder device 500, a pressurized area of the bottom portion 534 of the plunger 514 on which a pressure of the brake fluid in the pilot pressure chamber R13 acts is set comparatively large. Therefore, the open/close valve 502 is constructed to open when the brake fluid in the reaction force chamber R5 increases slightly. Accordingly, in the master cylinder 500, immediately after a beginning of a brake operation, that is, when the pressure of the brake fluid in the reaction force chamber R5 increases slightly, the inter-piston chamber R4 communicates with the reservoir 122.

On the other hand, when the open/close valve 444 is not-energized to be opened, the pressure of the brake fluid in the reaction force chamber R5 and the external communication passage 442 becomes equal to the atmospheric pressure, and thus the pressure of the brake fluid in the pilot chamber R13 also becomes equal to the atmospheric pressure. Accordingly, the valve body member 512 comes into abutting contact with the communication hole 526, and thus the open/close valve 502 is maintained in the close state. In other words, the communication of the inter-piston chamber R4 with the reservoir 122 is shut off, and thus the inter-piston chamber R4 is hermetically closed. Accordingly, the master cylinder device 500 can be actuated in the high-pressure-source-pressure/operation-force dependent pressurizing state.

It is noted that, in the master cylinder device 500, the open/close valve 444 is not to be closed during a brake operation in the high-pressure-source-pressure/operation-force dependent pressurizing state so as to prevent the reaction force chamber R5 from being put into a negative pressure, because a rearward movement of the input piston 306 with the open/close valve 444 closed would make the reaction force chamber R5 put in the negative pressure, whereby a force preventing the rearward movement of the input piston 306 would be applied to the input piston 306. For this reason, the open/close valve 444 is controlled to be closed when the operation amount becomes zero, that is, the input piston 306 is stopped by a stopper ring 344.

It is noted that the open/close valve 502 is constructed not to open by the pressure of the brake fluid in the inter-piston chamber R4 even when the master cylinder device 500 is put in the high-pressure-source-pressure/operation-force dependent pressurizing state and the pressure of the brake fluid in the inter-piston chamber R4 acts on a brake fluid in the fluid chamber R12. More specifically, the open/close valve 502 is constructed such that a force which pushes the valve body member 512 to shift from the separation member 525 never become larger than the force which is generated by the spring 530 and pushes the valve body member 512 onto the separation member 525, because an area of a portion of the valve body member 512 on which the pressure of the brake fluid in the fluid chamber R12 acts is considerably small. Therefore, the open/close valve 502 is maintained in the close state in the high-pressure-source-pressure/operation-force dependent pressurizing state.

On the other hand, in the electric failure condition, since the open/close valve 444 is put in the open state, the open/close valve 502 is maintained in the close state. Therefore, the communication of the inter-piston chamber R4 with the reservoir 122 is shut off, and thus the inter-piston chamber R4 is hermetically closed. Accordingly, the master cylinder device 500 can be actuated in the operation-force dependent pressurizing state. Incidentally, when the master cylinder device 500 is actuated in the operation-force dependent pressurizing state or the high-pressure-source-pressure/operation-force dependent pressurizing state, the stroke simulator 448 does not generate the operation reaction force, however, the driver can realistically feel the reaction force by the pressure of the brake fluid in the pressurizing chambers R1, R2, as the operation reaction force.

By the way, the master cylinder device 500 may employ another mechanical open/close valve substituting for the open/close valve 502. For example, a mechanical open/close valve may be employed which is put in an open state in the normal condition and put in a close state when the input pressure increases. Where such a mechanical open/close valve is employed, the inter-piston chamber R4 is hermetically closed, like the master cylinder device 110 of the first embodiment, in an increase of the input pressure. Therefore, the operation force is transmitted to the first pressurizing piston 302 via the brake fluid in the inter-piston chamber R4. That is, the master cylinder device 500 can shift from the high-pressure-source-pressure dependent pressurizing state to the high-pressure-source-pressure/operation-force dependent pressurizing state when the input pressure increases.

Second Embodiment

Figure 7:
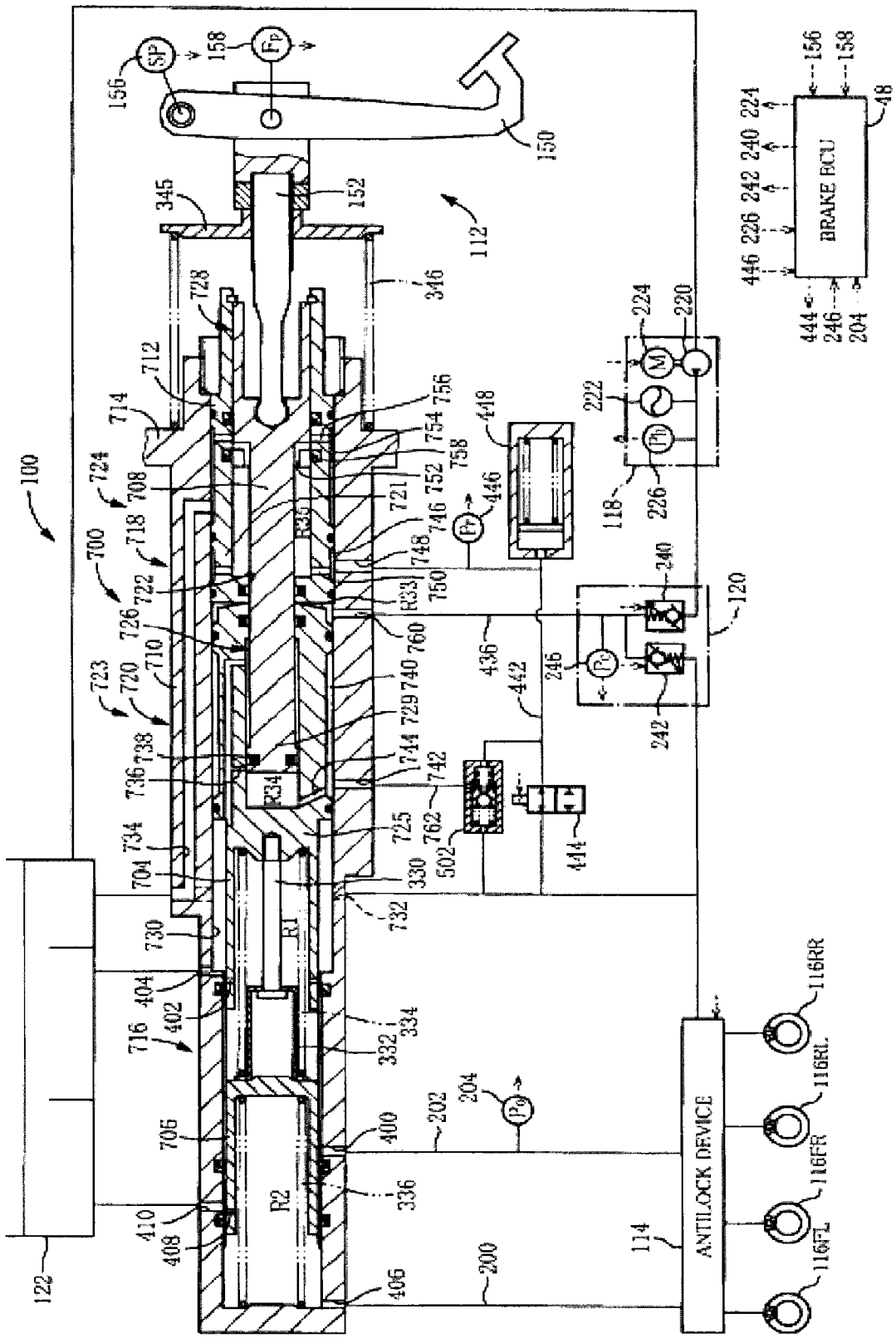
FIG. 7 is a view of a hydraulic brake system including the master cylinder device of a second embodiment according to the claimable invention.

FIG. 7 shows the hydraulic brake system 100 having a master cylinder device 700 of the second embodiment substituting for the master cylinder device 500 of the modified embodiment of the first embodiment. In the following explanation, only structure and actuation different from the master cylinder device 110 of the modified embodiment of the first embodiment are explained, the explanation regarding the structure and actuation similar to those in the master cylinder device 500 of the modified embodiment of the first embodiment is omitted.

<<Structure of Cylinder Device>>

The master cylinder device 700 includes a housing 702 which is a casing of the master cylinder device 700, a first pressurizing piston 704 and a second pressurizing piston 706 which pressurize the brake fluid to be supplied to the brake devices 116, and an input piston 708 to which the operation of the driver is inputted via the operation device 112. Incidentally, FIG. 7 shows a state in which the master cylinder device 700 is not actuated, that is, a brake operation is not performed.

The housing 702 mainly includes two members, specifically, a first housing member 710 and a second housing member 712. The first housing member 710 has a shape like a cylinder, on the whole, whose front end portion is closed and includes a flange 714 formed on an outer periphery of a rear end portion of the first housing member 710. The first housing member 710 is mounted on the body of the vehicle at the flange 714. The first housing member 714 is sectioned into three portions having mutually different inner diameters, specifically, a front small-diameter portion 716 arranged in a front side and having a small inner diameter, a rear large-diameter portion 718 arranged in a rear side and having a large inner diameter, and a middle portion 720 arranged in the middle between the front small-diameter portion 716 and the rear large-diameter portion 718, and having a middle inner diameter of their inner diameters.

The second housing member 712 is formed such that a front end portion 721 has a flange projecting for an inner side, and a through hole 722 being through the flange is provided in a center area of the front end portion 721. The second housing member 712 is fitted in the rear large diameter portion 718 of the first housing member 710 while the front end portion 721 contacts with a stepping face between the middle portion 720 and the rear large diameter portion 718. Accordingly, the housing 702 has a shape in which the front end portion 721 of the second housing member 712 functions as a separation wall, and thus the inside of the housing 702 is separated into a front side chamber 723 and a rear side chamber 724.

The second pressurizing piston 706 has a shape like a cylinder whose rear end portion is closed, and is slidably fitted in the front small-diameter portion 716 of the first housing member 710. The first pressurizing piston 704 has a shape like a cylinder on the whole, and the inside thereof is however sectioned into two portions by a partition wall portion arranged in the middle in the forward and rearward direction. That is, the first pressurizing piston 704 has a shape that has two blind holes being open at a front end and a rear end thereof, respectively. Incidentally, a rearward movement of the first pressurizing piston 704 is limited because the rear end thereof is stopped by a front end face of the second housing member 712. In addition, between the rear end of the first pressurizing portion 704 and the front end face of the second housing member 712, there is defined a fluid chamber R33 into which the pressure of the high-pressure-source device 118 is inputted. This fluid chamber R33 is referred to as an "input chamber", where appropriate. It is noted that the input chamber R33 is depicted in an almost squeezed state in FIG. 7.

The input piston 708 roughly has a shape like a cylinder. In the input piston 708, a front side thereof is a front small diameter portion 726 whose outer diameter is small, and a rear side thereof is a rear large diameter portion 728 whose outer diameter is large. That is, the input piston 708 has a shape in which the front small diameter portion 726 functioning as a transmission rod is unified. The input piston 708 is disposed such that the front small diameter portion 726 is through the through hole 722, a distal end portion 729 of the front small diameter portion 726 slidably contacts with an inner periphery of the bind hole being open at the rear end of the first pressurizing piston 704, and the rear large diameter portion 728 slidably contacts with an inner periphery of the second housing member 712. In addition, the input piston 708 is provided such that the distal end portion 729 and a bottom portion of the blind hole of the first pressurizing piston 704 are away from each other when a brake operation is not performed. In other words, a fluid chamber R34 is defined inside the first pressurizing piston 704 by the bottom portion of the blind hole of the first pressurizing piston 704 and the front small diameter portion 726. This chamber is referred to as an "inter-piston chamber", where appropriate. In addition, a ring-shaped fluid chamber R35 is defined by a front end face of the rear large diameter portion 728 and the inner periphery of the second housing member 712. This chamber is referred to as a "reaction force chamber", where appropriate.

In a front side of the first pressurizing piston 704, an outer diameter thereof is slightly smaller than an inner diameter of the middle portion 720 of the first housing member 710. Therefore, between an outer periphery of the first pressurizing piston 704 and an inner periphery of the first housing member 710, there is formed a fluid passage 730 which has a certain cross section area through which a brake fluid can flow. The fluid passage 730 communicates with the exterior through a communication hole 734 whose one end is a connection port being open to the exterior. Additionally, in the first housing member 710, there is formed a part of a communication passage 734 for a communication of the fluid passage 730 with the reservoir 122, and thus the fluid passage 730 communicates with the communication passage 734. Therefore, the fluid passage 730 communicates with the reservoir 122, so that a pressure in the passage is the atmospheric pressure.

In a peripheral wall of the first pressurizing piston 704, there is formed a communication hole 736 whose one end is open to the inter-piston chamber R34 and whose other end is open to the fluid passage 730. Therefore, the inter-piston chamber R34 can communicate with the reservoir 122. Additionally, on an outer periphery portion of the distal end portion 729 of the front small diameter portion 726 of the input piston 708, a seal member 738 capable of shutting off the communication is fitted. Specifically, when the input piston 708 moves forward relative to the first pressurizing piston 704 and then the seal member 738 passes by the communication hole 736, the communication of the inter-piston chamber R34 with the reservoir 122 through the communication hole 736 is shut off. It is noted that the rearward movement of the input piston 708 is limited by that a rear end portion is stopped by a rear end portion of the second housing member 712.

In a rear side of the first pressurizing piston 704, the outer diameter thereof is slightly smaller than the inner diameter of the middle portion 720 of the first housing member 710. Therefore, between the outer periphery of the first pressurizing piston 704 and the inner periphery of the first housing member 710, there is formed a fluid passage 740 which has a certain cross section area through which a brake fluid can flow. The fluid passage 740 communicates with the exterior through a communication hole 742 whose one end is a communication port being open to the exterior. In the peripheral wall of the first pressurizing piston 704, there is formed a communication passage 744 whose one end is open to the fluid passage 740 and whose other end is open to the inter-piston chamber R34. Therefore, the inter-piston chamber R34 communicates with the reservoir 122 through the communication passage 744, the fluid passage 740, and the communication hole 742. Incidentally, the opening of the other end of the communication passage 744 is provided in the vicinity of the bottom portion of the blind hole. Therefore, even when the distal end portion 729 of the input piston 708 comes close to and comes into abutting contact with the bottom portion of the blind hole, the inter-piston chamber R34 can communicate with the exterior.

A portion of the second housing member 712 arranged in a front side thereof has an outer diameter slightly smaller than an inner diameter of the first housing member 710. Therefore, between an outer periphery of the second housing member 712 and the inner periphery of the first housing member 710, there is formed a fluid passage 746 which has a certain cross section area through which a brake fluid can flow. The fluid passage 746 communicates with the exterior through a communication hole 748 whose one end is a communication port being open to the exterior. In the second housing member 712, there is formed a communication passage 750 whose one end is open to the fluid passage 746 and whose other end is open to the reaction force chamber R35. Therefore, the reaction force chamber R35 communicates with the exterior through the communication hole 750, the fluid passage 746, and the communication hole 748. To the communication port of the communication hole 748, the other end of the external communication passage 442 is connected.

The input piston 708 has a communication hole 752 whose one end is open to the reaction force chamber R35 at a stepping face formed by the front small-diameter portion 716 and the rear large-diameter portion 718 and whose other end is open to an outer peripheral face of the rear large diameter portion 728. A clearance 754 is formed between the first housing member 710 and the second housing member 712. The second housing member 712 has a communication hole 756 whose one end is open to the inner periphery of the second housing member 712 and whose other end is open to the clearance 754. Additionally, one end of the communication passage 734 is open to the clearance 754, and thus the clearance 754 communicates with the reservoir 122. When a brake operation is not performed, the opening of the communication hole 752 is placed behind a seal member 758, and thus the communication hole 752 communicates with the communication hole 756 and the reaction force chamber R35 is allowed to communicate with the reservoir 122. However, when a brake operation force is performed, that is, the input piston 708 is moved forward, the communication hole 752 cannot communicate with the communication hole 756 by the seal member 758 fitted in the inner periphery of the second housing member 712. In other words, the communication of the reaction force chamber R35 with the reservoir 122 is prohibited. Therefore, in the master cylinder device 700, the communication hole 752, the communication hole 756, and the seal member 758 constitute the low-pressure-source communication mechanism for securing the communication of the reaction force chamber R35 with the reservoir 122 when a brake operation is not performed.

In addition, the housing member 710 has a communication hole 760 whose one end is a communication port being open to the exterior and whose other end is open to the input pressure chamber R33. To the communication port of the communication hole 760, the other end of the input pressure introduction passage 436 is connected.

In the exterior of the housing 702, there is provided an external communication passage 762 whose one end is connected to the connection port of the communication hole 732 and whose other end is connected to the connection port of the communication hole 742. Therefore, the inter-piston chamber R34 can communicate with the reservoir 122 through the external communication passage 762. Thus, in the master cylinder device 700, the inter-piston-chamber communication passage includes the external communication passage 762, and the mechanical open/close valve 502 is provided in the middle of the external communication passage 762.

<<Actuation of Master Cylinder Device>>

The master cylinder device 700 constructed thus can be actuated in the same way as the master cylinder device 500 of the modified embodiment of the first embodiment. In the normal condition, the open/close valve 444 is energized to be in the close state, while the open/close valve 502 is put in the close state during a brake operation. Therefore, the inter-piston chamber R34 communicates with the reservoir 122, and thus the master cylinder device 700 is actuated in the high-pressure-source-pressure dependent pressurizing state. On the other hand, when the open/close valve 444 is not-energized to be in the open state, the open/close valve 502 is put in the close state, and then the inter-piston chamber R34 is hermetically closed. Thus, the master cylinder device 700 is actuated in the high-pressure-source-pressure/operation-force dependent pressurizing state. In addition, the master cylinder device 700 is actuated in the operation-force dependent pressurizing state in the electric failure condition.

When the master cylinder device 700 is actuated in the high-pressure-source-pressure/operation-force dependent pressurizing state and the operation-force dependent pressurizing state, the open/close valve 502 is maintained in the close state. However, when a brake operation is not performed, the inter-piston chamber R34 is not hermetically closed. More specifically, when a brake operation is not performed, the inter-piston chamber R34 communicates with the reservoir 122 through the communication hole 736 of the first pressurizing piston 704. When a brake operation is begun, the input piston 708 moves forward and then the seal member 738 passes by the communication hole 736, whereby the inter-piston chamber R34 is hermetically closed. It is noted that, when the brake pedal 150 is not operated, the seal member 738 is positioned behind the communication hole 736, however, a distance between them is set to be comparatively small in the master cylinder device 700. Therefore, only a slight operation of the brake pedal 150 hermetically closes the inter-piston chamber R34, and thus the brake device 116 can generate the hydraulic brake force.

When a brake operation is released, the seal member 738 returns behind the communication hole 736, and thus the inter-piston chamber R34 communicates with the reservoir 122 again. That is, in the master cylinder device 700, the communication of the inter-piston chamber R34 with the reservoir 122 is secured when a brake operation is not performed. Thus, the master cylinder device 700 is constructed so as to prevent a pressure from remaining in the inter-piston chamber R34, thereby preventing a drag phenomenon in the brake device 116, that is, preventing the brake fluid in the pressurizing chambers R1, R2 from being pressurized by the remaining pressure.

By the way, comparing the master cylinder device 110 of the first embodiment and the master cylinder device 700 of the second embodiment, the master cylinder device 110 has an advantageous in the light of utility. In the master cylinder device 110 of the first embodiment, the transmission rod 340 is fixed to the first pressurizing piston 302. Therefore, it is possible to make a distance required for pulling out the input piston from the housing be smaller than that in the master cylinder device 700 in which the input piston 708 is provided with the front small diameter portion 726 functioning as a transmission rod. Consequently, as for the master cylinder device 110 of the first embodiment, a work in decomposing the master cylinder device 110 for an inspection or the like is easy.

In addition, in the master cylinder device 110 of the first embodiment, the low-pressure-source communication mechanism is provided in front of an input piston. Therefore, it is possible to make a length of a rearward portion of the input piston be shorter than that of the master cylinder device 700 in which the low-pressure-source communication mechanism is provided in a rearward portion of the input piston 708. Consequently, the master cylinder device 110 can be shortened in a total length compared to the master cylinder device 700.

Modified Embodiment

Figure 8:
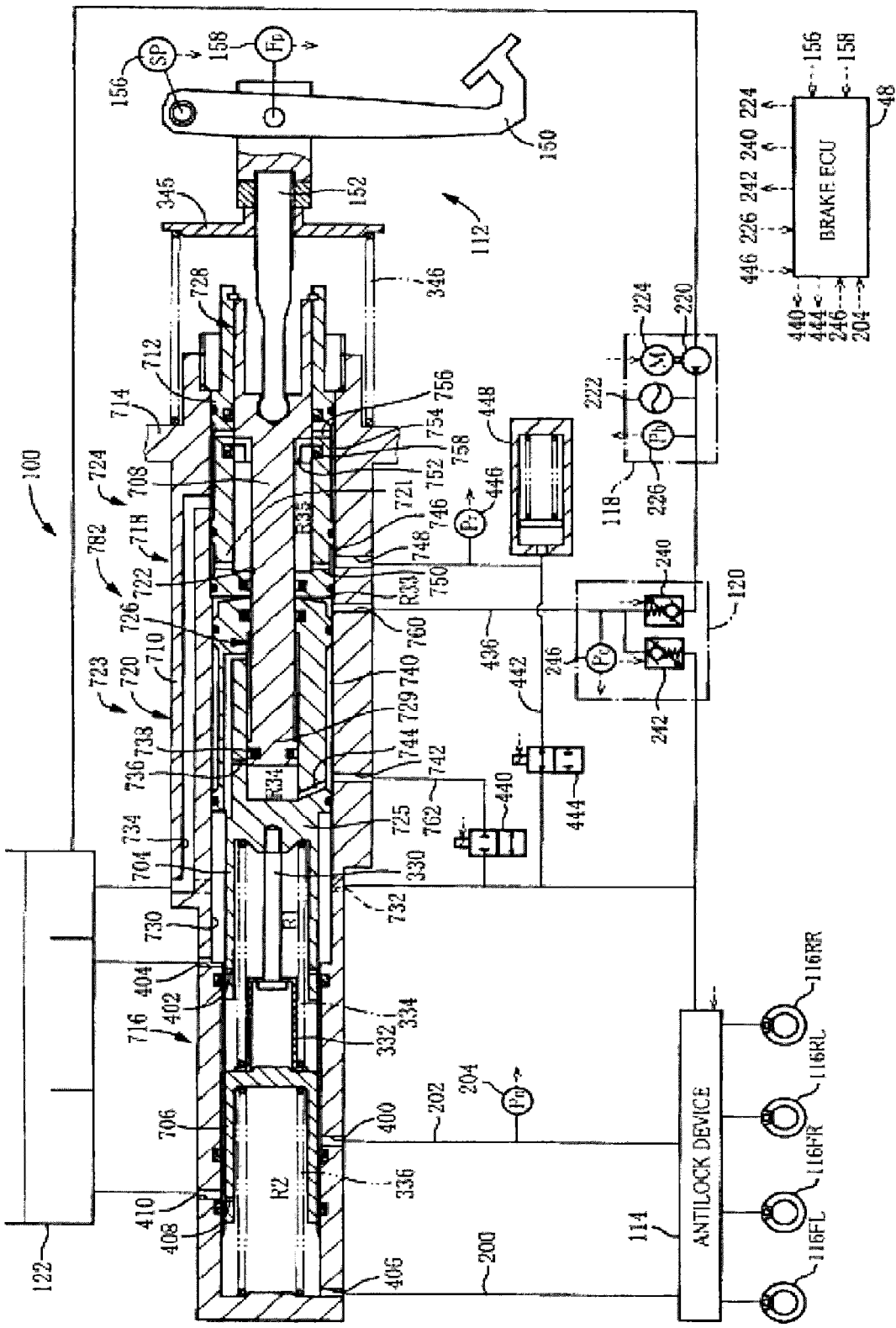
FIG. 8 is a view of a hydraulic brake system including the master cylinder device of the modified embodiment of the second embodiment.

FIG. 8 shows a master cylinder device 782 of a modified embodiment of the second embodiment which employs the electromagnetic open/close valve 440 employed in the master cylinder device 110 of the first embodiment, substituting for the mechanical open/close valve 502. The open/close valve 440 is provided in the middle of the external communication passage 762 and is put in the open state in the normal condition. The master cylinder device 782 constructed thus can be actuated in the same way as the master cylinder device 110 of the first embodiment. That is, in the normal condition, the open/close valve 444 and the open/close valve 440 are energized to be in the close state and the open state, respectively. Therefore, the inter-piston chamber R34 communicates with the reservoir 122, and thus the master cylinder device 782 is actuated in the high-pressure-source-pressure pressurizing state. When a separation distance between the bottom portion of the blind hole being open at the rear end of the first pressurizing piston 704 and the distal end portion 729 of the front small diameter portion 726 of the input piston 708 becomes zero, that is, when the distal end portion 729 of the transmission rod comes into abutting contact with the bottom portion of the blind hole, the master cylinder device 782 is actuated in the high-pressure-source-pressure/operation-force pressurizing state. In addition, the master cylinder device 782 is actuated in the operation-force dependent pressurizing state in the electric failure condition.

Also in the master cylinder device 782, when the distal end portion 729 of the input piston 708 does not abut on the bottom portion of the blind hole of the first pressurizing piston 704 and the open/close valve 440 is energized to be closed, the master cylinder device 728 can be activated in the high-pressure-source-pressure/operation-force dependent pressurizing state. where the open/close valve 440 is closed when the input pressure becomes equal to the high-pressure-source pressure, the output pressure increases smoothly with respect to an increase of the operation amount. Therefore, the driver can perform a brake operation without sensing unfavorable feeling in a change of the brake force with respect to the operation amount.

In a case that a large brake force is required, such as a case of an emergency brake, the inter-piston chamber R34 may be hermetically closed irrespective of the input pressure. When the open/close valve 440 is opened in a sudden increase of the change speed of the operation amount, the output pressure becomes higher than the output pressure in the high-pressure-source-pressure dependent pressurizing state. Therefore, comparatively large hydraulic brake force is generated swiftly.

REFERENCE SIGNS LIST

110: master cylinder device 116: brake device 118: high-pressure-source device (high pressure source) 122: reservoir (low pressure source) 150: brake pedal (brake operation member) 300: housing 302: first pressurizing piston (pressurizing piston) 306: input piston 438: external communication passage (inter-piston-chamber communication passage) 440: electromagnetic open/close valve (inter-piston-chamber hermetically-closing device) 442: external communication passage (reaction-force-chamber releasing device) 444: electromagnetic open/close valve (reaction-force-chamber releasing device) 454: compression coil spring (pressurizing mechanism) R1: first pressurizing chamber (pressurizing chamber) R3: input chamber R4: inter-piston chamber R5: reaction force chamber R6: pressure accumulation chamber 500: master cylinder device 502: mechanical open/close valve (inter-piston-chamber hermetically-closing device) 700: master cylinder device 702: housing 704: first pressurizing piston (pressurizing piston) 708: input piston 726: front small diameter portion (transmission rod) R33: input chamber R34: inter-piston chamber R35: reaction force chamber 782: master cylinder device

The invention claimed is:

1. A master cylinder device for supplying a pressurized brake fluid to a brake device provided in a wheel and actuated by a pressure of the brake fluid, comprising:
    a housing whose front side is closed and which has a separation wall for separating the inside of the housing into a front side chamber and a rear side chamber;
    a pressurizing piston disposed in the front side chamber of the housing such that a pressurizing chamber for pressurizing the brake fluid to be supplied to the brake device is defined in front of the pressurizing piston and an input chamber into which a brake fluid from a high pressure source is introduced is defined in the rear of the pressurizing piston and in front of the separation wall, the pressurizing piston being moved by a pressure of the brake fluid in the input chamber;
    an input piston which is disposed in the rear side chamber of the housing, a rear end portion of the input piston being connected to a brake operation member, the input piston being configured to move forward by an operation force applied to the brake operation member;
    an operation-reaction-force applying mechanism for applying an operation reaction force to the input piston according to a forward movement amount of the input piston; and
    a transmission rod which is through the separation wall and the input chamber such that the brake fluid is prevented from flowing between the rear side chamber and the input chamber, the transmission rod having a proximal end portion that is fixed in one of the input piston and the pressurizing piston and a distal end portion that is apart from the other of the input piston and the pressurizing piston in a state in which both of the input piston and the pressurizing piston are not moved forward,
    wherein, the master cylinder device is configured such that, in a state in which the distal end portion of the transmission rod does not abut on the other of the input piston and the pressurizing piston, a pressurizing of the brake fluid in the pressurizing chamber depending on a force caused by a pressure from the high pressure source in the input chamber on the rear of the pressurizing piston is realized, and, in a state in which the distal end portion of the transmission rod abuts on the other of the input piston and the pressurizing piston, a pressurizing of the brake fluid in the pressurizing chamber depending on a force in which the operation force is added to the force caused by the pressure of the high pressure source is realized.

2. The master cylinder device according to claim 1,
wherein the other of the input piston and the pressurizing piston has a blind hole in which the transmission rod is fitted, and
wherein a bottom portion of the blind hole and the transmission rod are apart from each other in the state in which the input piston does not move forward.

3. The master cylinder device according to claim 2,
wherein an inter-piston chamber filled with a brake fluid is defined by the bottom portion of the blind hole and the transmission rod, and
wherein the master cylinder device comprises
    an inter-piston-chamber communication passage by which the inter-piston chamber communicates with a low pressure source, and
    an inter-piston-chamber hermetically-closing device for hermetically closing the inter-piston chamber by shutting off the inter-piston-chamber communication passage.

4. The master cylinder device according to claim 3,
wherein the inter-piston-chamber hermetically-closing device is configured so as to hermetically close the inter-piston chamber on the basis of any one of a pressure of the brake fluid in the pressurizing chamber, a pressure of the brake fluid in the input chamber, the operation force, and an operation amount of the brake operation member.

5. The master cylinder device according to claim 4,
wherein the inter-piston-chamber hermetically-closing device is configured so as to hermetically close the inter-piston chamber when any one of the pressure of the brake fluid in the pressurizing chamber, the pressure of the brake fluid in the input chamber, the operation force, and the operation amount of the brake operation member exceeds a predetermined value.

6. The master cylinder device according to claim 3,
wherein the inter-piston-chamber hermetically-closing device includes an electromagnetic valve provided on the inter-piston-chamber communication passage and a valve controller for controlling the electromagnetic valve.

7. The master cylinder device according to claim 3,
wherein the inter-piston-chamber hermetically-closing device includes a mechanical valve to be activated with any one of the pressure of the brake fluid in the pressurizing chamber, the pressure of the brake fluid in the input chamber, and a pressure indicating the operation force serving as a pilot pressure.

8. The master cylinder device according to claim 2,
wherein a space surrounding the transmission rod is sectioned by the separation wall and the input piston whereby a reaction force chamber having a ring shape and filled with a brake fluid is defined, and the master cylinder device comprises a pressurizing mechanism which includes a pressure accumulating chamber communicating with the reaction force chamber and filled with a brake fluid, and which elastically pressurizes the brake fluid in the pressure accumulating chamber,
wherein the operation-reaction-force applying mechanism includes the reaction force chamber and the pressurizing mechanism.

9. The master cylinder device according to claim 8,
wherein the master cylinder device comprises a reaction-force-chamber releasing device for releasing the reaction force chamber to a low pressure source.

10. The master cylinder device according to claim 9,
wherein the reaction-force-chamber releasing device is configured to release the reaction force chamber to the low pressure source in an electric failure condition.

11. The master cylinder device according to claim 9,
wherein the reaction-force-chamber releasing device includes a reaction-force-chamber communication passage by which the reaction force chamber communicates with the low pressure source, and a normally opened electromagnetic open/close valve provided on the reaction-force-chamber communication passage.

12. The master cylinder device according to claim 2,
wherein, the master cylinder device is configured such that, in a state in which the distal end portion of the transmission rod abuts on the other of the input piston and the pressurizing piston, the pressure of the brake fluid in the input chamber does not act as a force which is applied to the input piston.

13. The master cylinder device according to claim 2, further comprising a second pressurizing piston disposed in front of the pressurizing chamber such that a second pressurizing chamber for pressurizing the brake fluid to be supplied to the brake device is defined between a front of the second pressuring piston and the front of the housing.

14. The master cylinder device according to claim 13,
wherein the pressurizing chamber pressurizes the brake fluid supplied to a left and a right rear wheel.

15. The master cylinder device according to claim 13,
wherein the second pressurizing chamber pressurizes the brake fluid supplied to a left and a right front wheel.

16. The master cylinder device according to claim 1,
wherein the high pressure source includes a pump which increases the pressure of the brake fluid, an accumulator which stores the pressurized brake fluid, and a motor which drives the pump.

17. The master cylinder device according to claim 16, further comprising a pressure-intensifying/reducing device through which the high pressure source is connected to the input chamber, the pressure-intensifying/reducing device including a pressure-intensifying valve and a pressure-reducing valve.

* * * * *